United States Patent [19]

Bolgiano et al.

[11] 4,272,650
[45] Jun. 9, 1981

[54] POWER SUPPLY SYSTEM

[75] Inventors: Duane R. Bolgiano, Bala Cynwyd; Joel M. Benjamin, Jr., Pottstown; Victor Meyer, Jr., Telford, all of Pa.

[73] Assignee: International Mobile Machines Incorporated, Bala Cynwyd, Pa.

[21] Appl. No.: 951,737

[22] Filed: Oct. 16, 1978

Related U.S. Application Data

[62] Division of Ser. No. 755,615, Dec. 29, 1976, Pat. No. 4,130,731.

[51] Int. Cl.³ .............................................. H04M 19/00
[52] U.S. Cl. ....................................... 179/77; 307/66
[58] Field of Search ............. 179/2 EB, 81 R; 307/77; 320/66, 3, 6, 8, 15

[56] References Cited

U.S. PATENT DOCUMENTS

| | | | |
|---|---|---|---|
| 3,249,769 | 5/1966 | Mierendorf | 307/66 |
| 3,267,288 | 8/1966 | Maiden et al. | 307/66 |
| 3,603,973 | 9/1971 | Howgh | 307/66 |
| 3,806,663 | 4/1974 | Peek et al. | 179/2 EB |

*Primary Examiner*—John H. Wolff
*Assistant Examiner*—Joseph A. Popek

[57] ABSTRACT

An electrical control system containing a power supply network including a primary high voltage power source and a secondary low voltage power source, the primary power source being held inactive except for periodic intervals of time, and also being removable for replacement or recharging; the secondary power source being charged during operation of the primary power source and being operative while the primary power source is inoperative.

5 Claims, 14 Drawing Figures

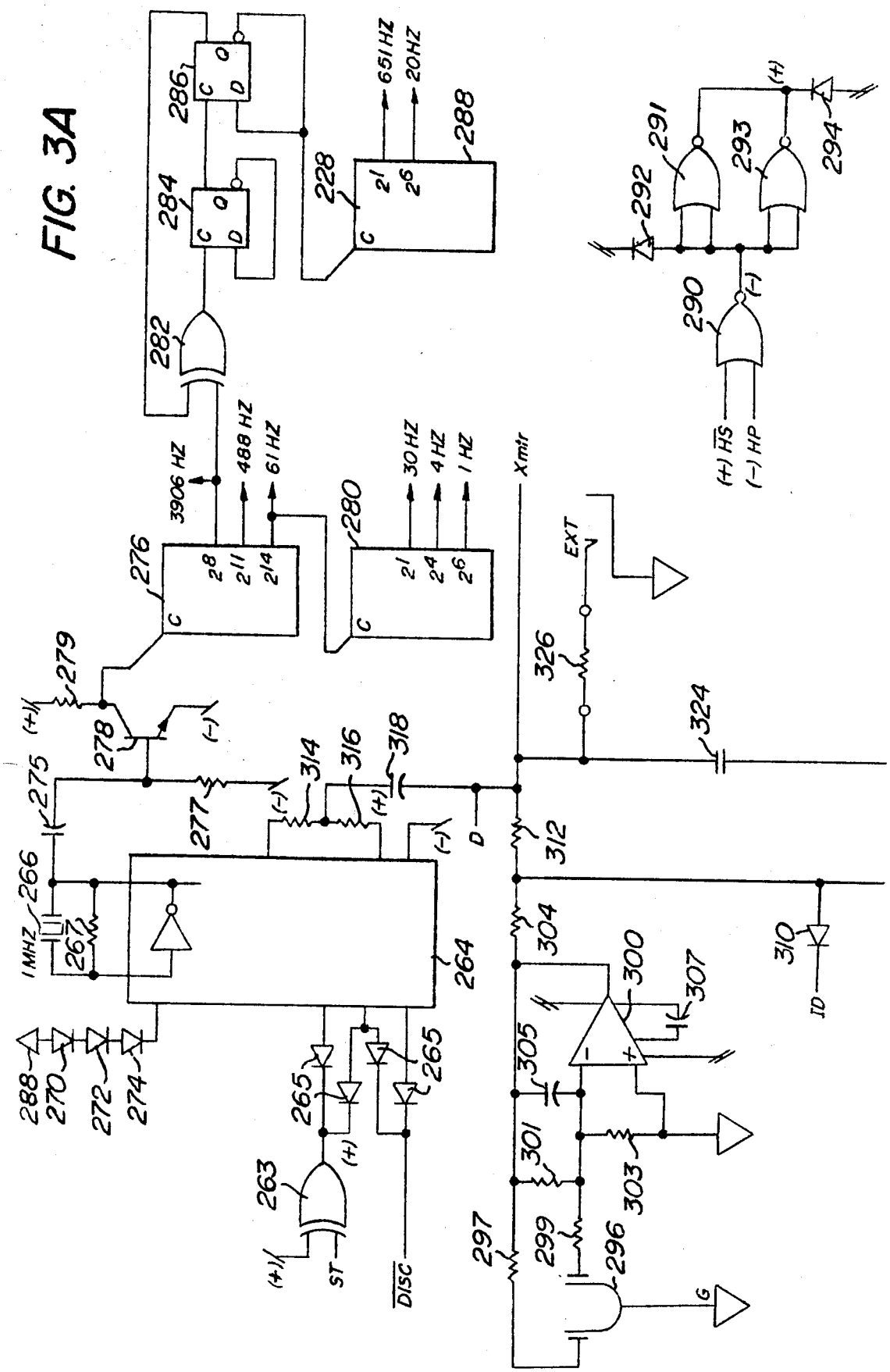

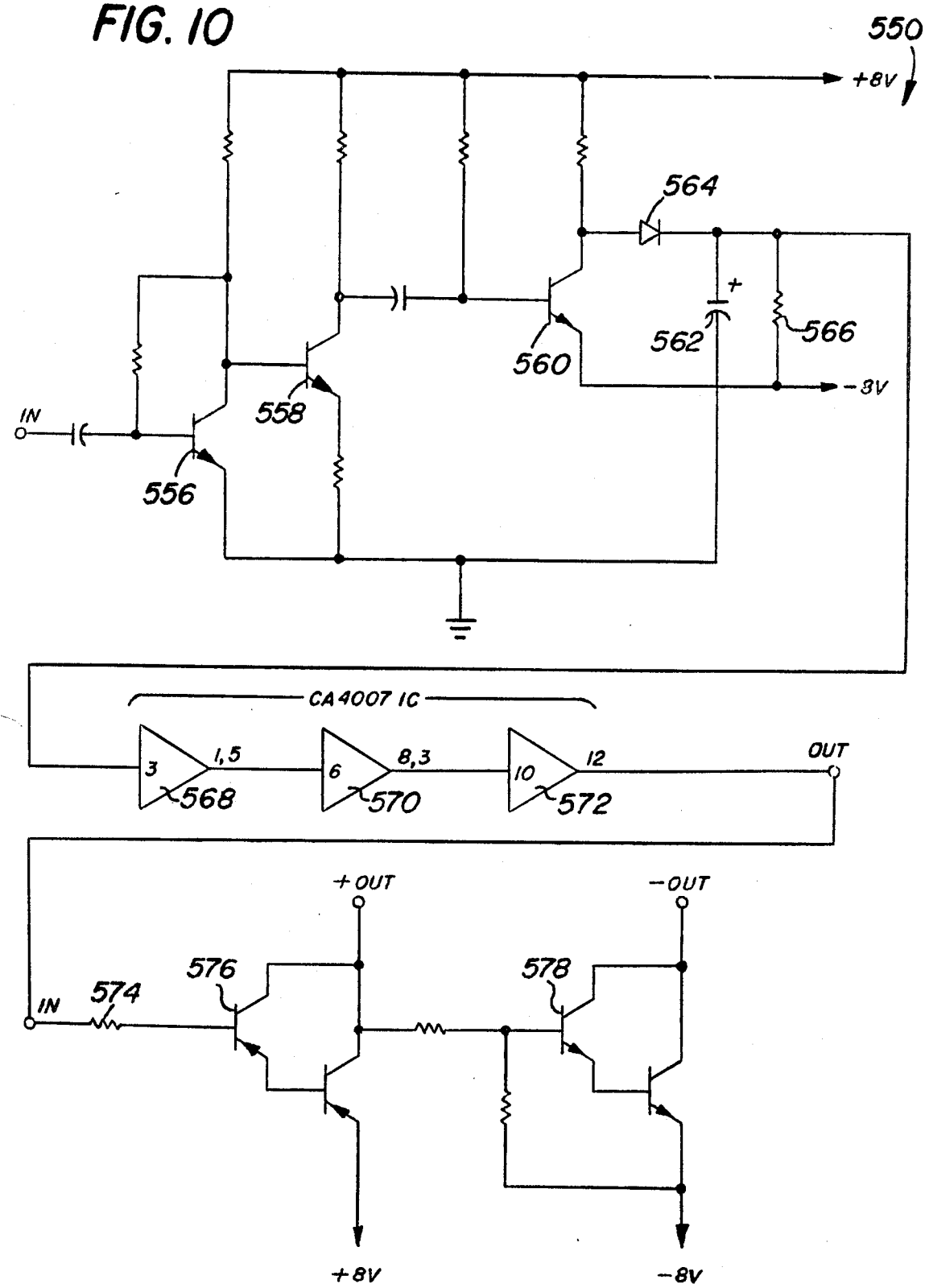

POWER SUPPLY SYSTEM

This application is a division of application Ser. No. 755,615, filed Dec. 29, 1976 now U.S. Pat. No. 4,130,731.

This invention relates to a portable telephone system, and it particularly relates to a portable telephone system wherein the operation of the system is totally automatic, permitting its use in the same manner as an ordinary land line phone.

A number of telephone systems have heretofore been designed which are characterized by the fact that the subscriber units are not normally tied to a fixed location. Generally, such units have been mounted on moving vehicles such as automobiles, boats, airplanes, or the like. It has recently been recognized that the provision of such a portable unit which is capable of being carried on the person would be highly advantageous, but such types of systems have been usually effective only for communications through a telephone operator at a base station or, even when of the so-called "automatic" type, have been subject to undue control by the base station as to period of use, relying on the base station to set up the channels of communication before the subscriber unit can begin its communication.

Furthermore, the prior systems generally use a maximum signal system with a special audio tone, whereby they operate on specific exclusive frequencies which severly limits the lines open to the subscriber, in contrast to the utilization of a minimum signal system, operating on shared frequencies, which permits a much wider selection of lines open to the subscriber. In other words, in these prior systems, the subscriber unit must search for a specific channel with a tone thereon, whereas a better system utilizes any channel that is open. Other prior systems utilize pulses for designating subscriber units rather than tones.

In addition, although some prior systems utilize a VOX system and some utilize a duplex system, none appear to utilize the combination of both a VOX and duplexer system. The VOX system is important in portable systems because, if the transmitter is only on when audio is being fed into the audio input, battery power is greatly conserved and, since the portable unit utilizes a battery, it requires less battery changing when power is conserved. The duplexer system is also important since it permits simultaneous transmission and reception in the same manner as an ordinary telephone.

Many prior systems also utilize a subaudible tone that is transmitted by the subscriber unit continuously, whereby the base station only determines when the subscriber unit is finished with the conversation when the tone disappears. A more efficient system is one utilizing a tone burst at the beginning and another tone burst at the end of the conversation, thereby eliminating the necessity for a continuous signal. This permits use of the above-mentioned VOX since the VOX cannot be used where it is necessary to keep the transmitter on all the time in order to transmit the constant tone.

Many prior systems also require constant receiver scanning. This requires a large power expenditure. If the system is adapted to use interrupted receiver scanning wherein the receiver is only on for a portion of time, the saving in battery power is very significant.

Prior systems, in general, require that the ringing signal be controlled by the base station. Since different frequencies are used for different subscriber units, the ringing signal is somewhat different in each instance. If the ringing signal is generated locally on the subscriber unit, the same ringing signal can be generated for each unit regardless of the difference in frequencies. Furthermore, when the ringing signal, busy signal, or other signal, is generated locally, there is only intermittent contact with the base station until such time as there is a full two-way completed cycle of acknowledgement that the base station and subscriber unit are in communication with each other (handshake). This minimizes any possible interference by the ringing signals, busy signals, or the like with other parties already on the line, or any inadvertent breaking in on other parties.

It is, therefore, one object of the present invention to overcome the above deficiencies of the prior art by providing a portable telephone system of the "automatic" type which is used in the same manner as a standard "fixed" type of system whereby the subscriber can place a call by merely removing the handset from the hook and dialing the number, and can receive a call by merely lifting the handset off the hook after receiving a ringing or other similar signal.

Another object of the present invention is to provide a portable system of the aforesaid type wherein the subscriber is not limited to any particular channel or frequency but can use any channel that is not already in use by another subscriber.

Another object of the present invention is to provide a portable system of the aforesaid type which conserves power both for transmission and reception and, thereby, significantly prolongs the life of a battery unit.

Other objects and many of the attendant advantages of this invention will be readily appreciated as the same becomes better understood by reference to the following description when read in conjunction with the accompanying drawings wherein:

FIG. 1 is a block diagram of the audio and supervisory logic system utilized in the present invention.

FIGS. 2A and 2B constitute a single schematic view of the actual logic used in the diagram of FIG. 1, wherein FIG. 2A is the upper portion and FIG. 2B is the lower portion of the circuitry.

FIGS. 3A and 3B constitute the upper and lower portions respectively, of the clock system and its associated parts, as shown in schematic view.

FIG. 10 is a schematic view of a VOX preamplifier detector and shaping circuitry embodying the present invention.

SUPERVISORY LOGIC

Figure 1:
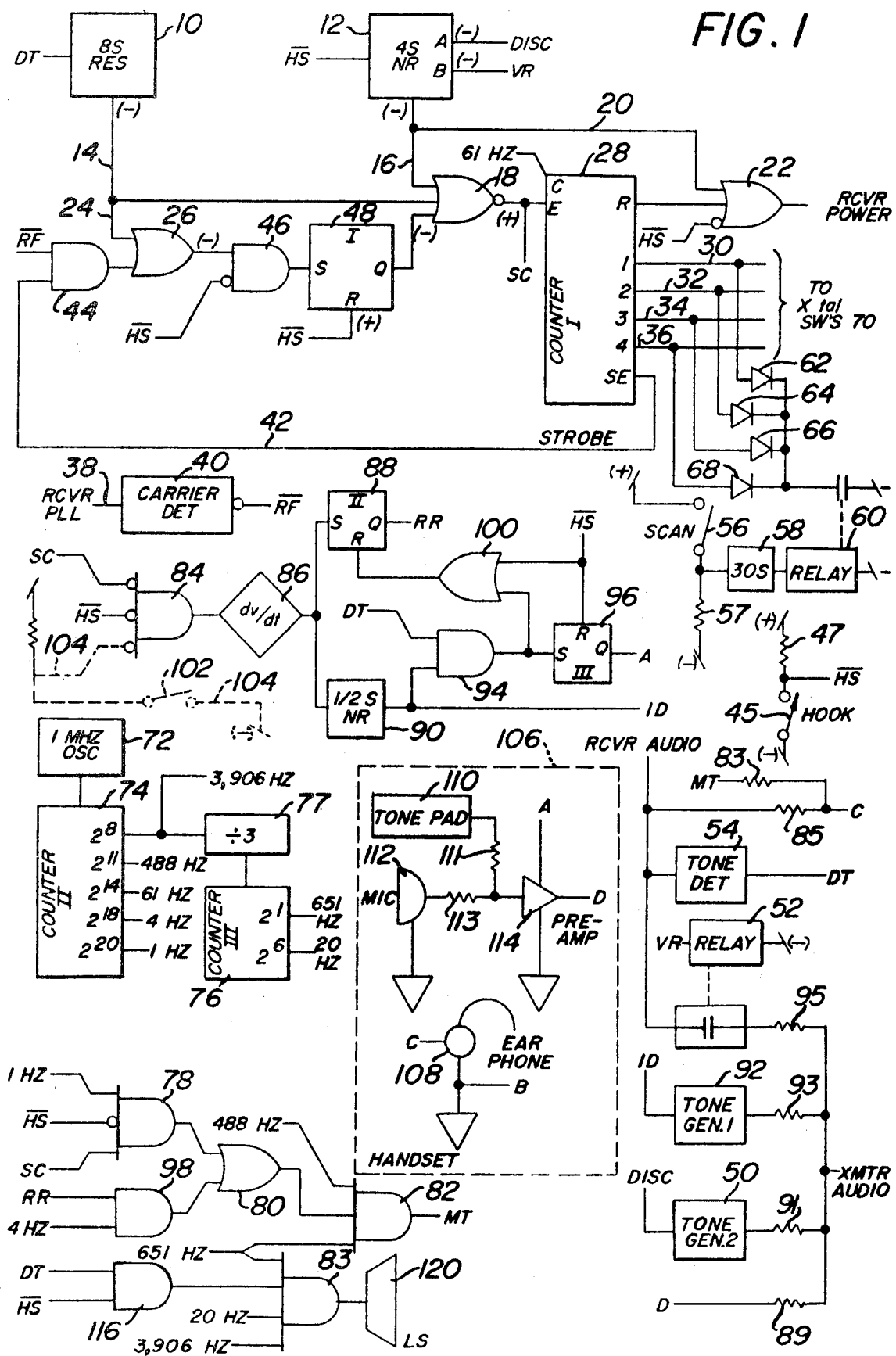
Figure 2A:
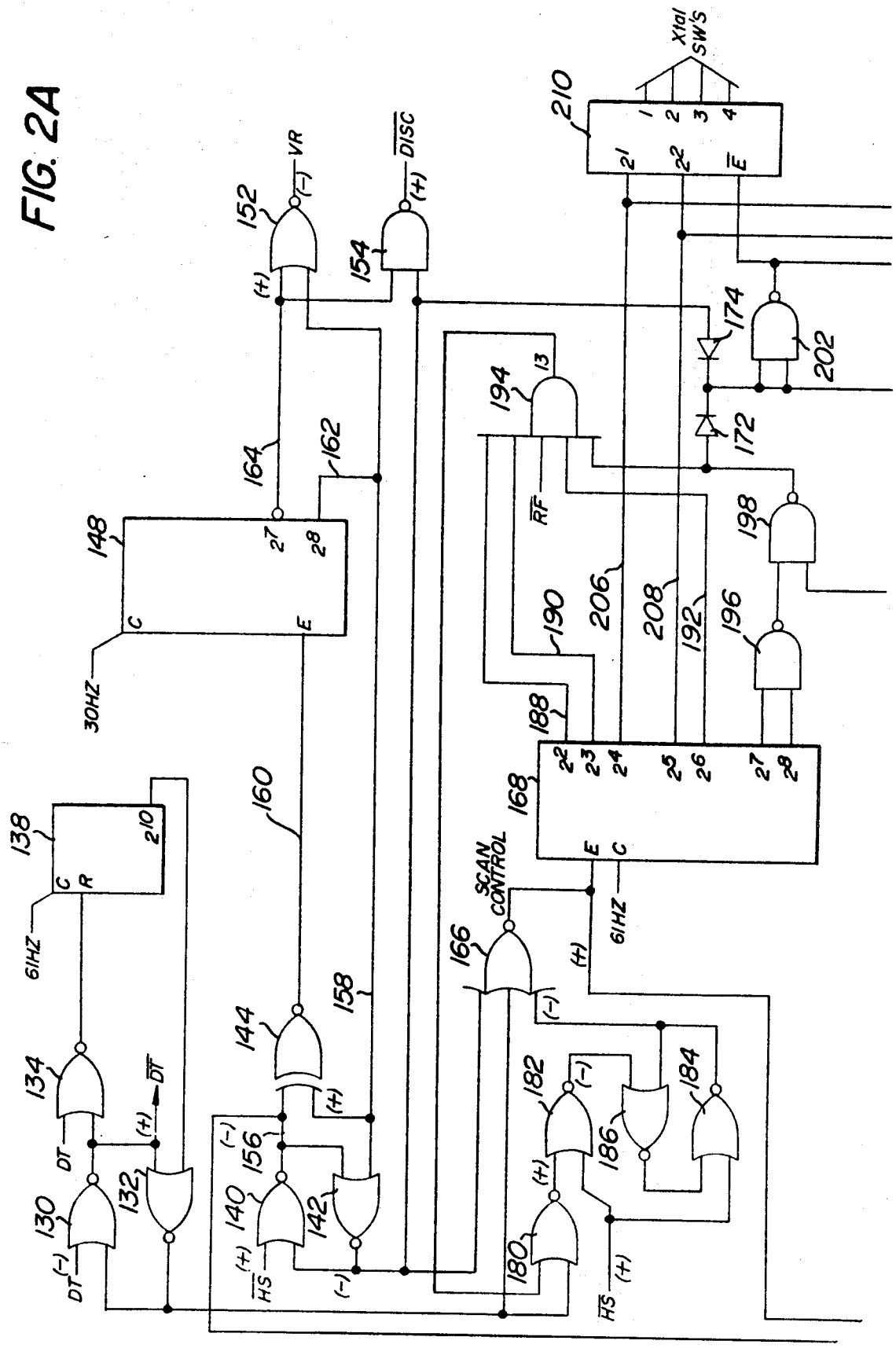
Figure 2B:
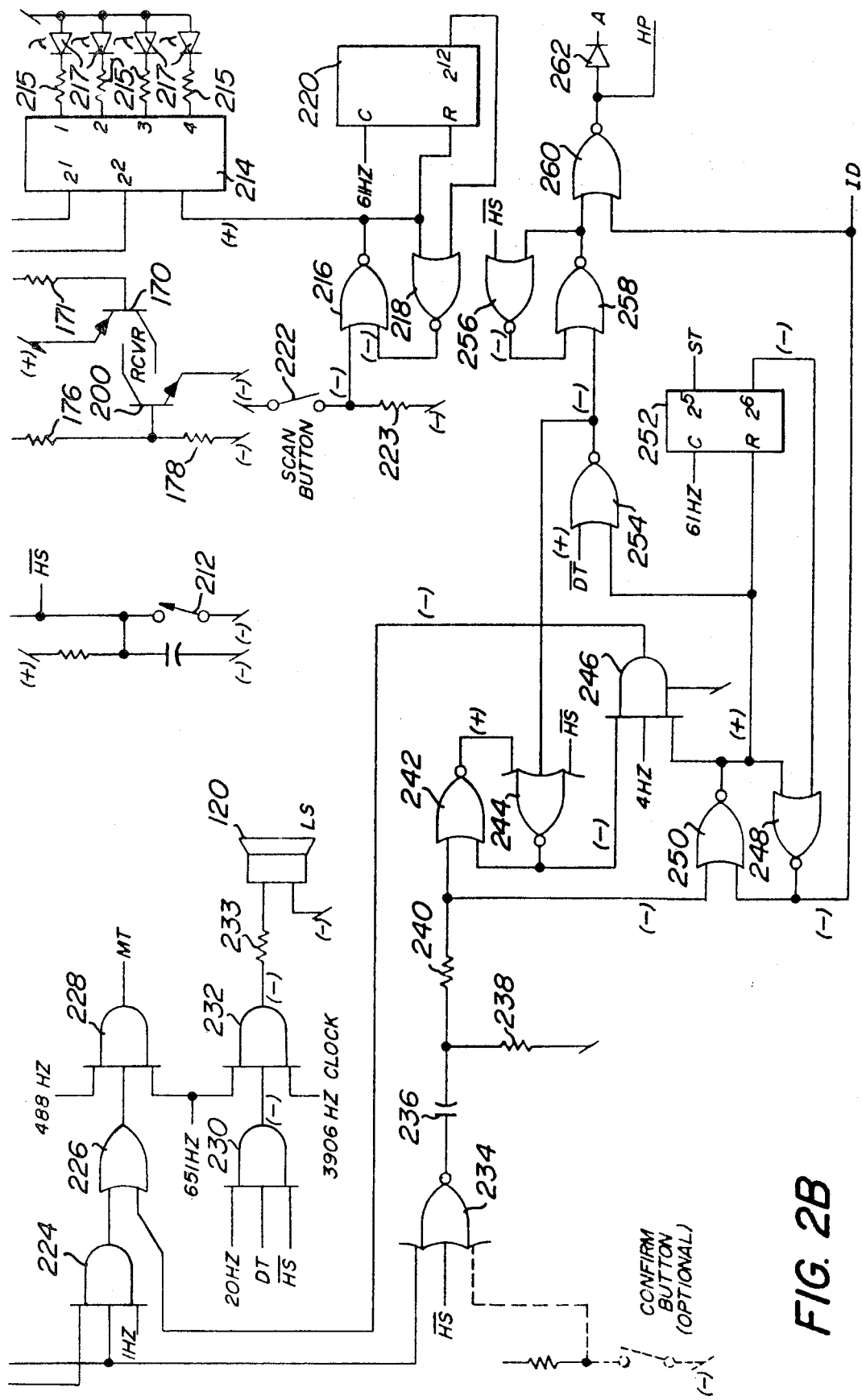

Referring now to FIG. 1, showing the logic in generally block diagram form, there is shown an 8-second monostable 10 and a 4-second monostable 12, each of which will be described in greater detail hereinafter. Both monostables are connected through respective lines 14 and 16 to a NOR gate 18, the monostable 12 also being connected through line 20 to an OR gate 22, while the monostable 10 is connected through line 24 to an OR gate 26. The output of NOR gate 18 determines whether scanning occurs by enabling or disabling (turning on or off) the counter 28.

The output of OR gate 22 provides power to the receiver so that if the output of this gate is negative, the receiver is made inoperative, while if it is positive, the receiver is made operative. While the power is on, the counter 28 turns the receiver on for one second out of each four seconds but is overriden by the monostable 12, so that the receiver stays on continuously for a full four seconds if the monostable 12 is in its "on" stable state. Otherwise, it is on only for one second out of four. This conserves power because the receiver requires only one-fourth the power it would require if it were on all the time. The lines 30, 32, 34, and 36 go to the receiver and to the transmitter and act to select the frequencies to which the receiver and transmitter are tuned.

In the embodiment shown in FIG. 1 there are four channels, each channel consisting of two frequencies. The subscriber phone transmits on one frequency while the base station transmits on the other frequency of each channel. The four channels are spaced 25 kHz apart, while the difference in the frequencies between the transmitter and receiver is 5 MHz. In this manner, at the end of three seconds of silence, the receiver is turned on and is tuned to each channel for ⅛ second twice around. Additionally, another output is taken from the receiver, this output being shown at 38, and this output, which is taken from a phase locked loop in the receiver, is applied to a carrier detector 40 for the purpose of detecting whether a carrier is present. The carrier detector 40 provides an output indicated as $\overline{RF}$. If a carrier is present, line $\overline{RF}$ is negative, while if a carrier is absent, line $\overline{RF}$ is positive.

Counter 28 also generates a strobe pulse while it is counting. This strobe pulse is indicated at 42, and occurs during the last ¼ of each period during which the receiver is tuned to a particular frequency. The strobe pulse is applied to an AND gate 44, to which the $\overline{RF}$ signal from the detector 40 is applied, and since the strobe pulse occurs only during the last ¼ of each period, it permits the receiver to settle for about 1/10 second before the signal $\overline{RF}$ is examined by gate 44.

The hook switch 45 provides a signal that is actuated by removing or replacing the handset, as indicated at $\overline{HS}$. The resistor 47 acts as pullup resistor to make line $\overline{HS}$ positive when switch 45 is open. If the handset is taken off-hook, $\overline{HS}$ becomes negative, while when it is replaced on-hook, $\overline{HS}$ becomes positive. When the handset is taken off-hook and $\overline{HS}$ becomes negative, counter 28 continues to scan until, during a strobe pulse, $\overline{RF}$ is found to be positive, indicating absence of a carrier. At this time, the output of gate 44 becomes positive, which makes the output of OR gate 26 positive. Since $\overline{HS}$ is negative, the output of AND gate 46, to which both the output of gate 26 and $\overline{HS}$ are applied, becomes positive. This sets flip-flop 48 since $\overline{HS}$, as applied thereto, is now negative, which causes the scan control line on the output of NOR gate 18 to become negative, thereby disabling counter 28 so that scanning stops and the receiver continues to be tuned to the frequency which had no carrier present. If a carrier should subsequently appear, since flip-flop 48 has been set, counter 28 is not affected. Furthermore, when $\overline{HS}$ became negative, it caused the output of OR gate 22 to remain positive, thereby applying power continuously to the receiver as long as the handset is off-hook. In this manner, the function of finding a free channel and seizing it upon removal of the handset is accomplished.

Replacing the handset on-hook resets flip-flop 48 so that scanning may again be begun. However, replacing the handset on-hook causes $\overline{HS}$ to become positive, thereby triggering the four-second monostable 12. This prevents resumption of scanning for a period of 4 seconds and continues to hold the receiver on via OR gate 22 for the same 4 seconds. The output of monostable 12 that is indicated as DISC is positive for the first 2 seconds of the 4-second period, while the output indicated as VR is positive for the second 2 seconds. In this manner, when the handset is replaced, the positive DISC enables the tone generator designated 50 which transmits tones over the transmitter for the first 2 seconds, while during the next 2 seconds, line VR, being positive, operates a relay 52 which connects the output of the receiver audio to the input of the transmitter audio. At the conclusion of the 4 seconds, the circuits are all returned to the initial state prior to taking the handset off-hook.

A tone detector 54 is connected to the receiver, whereby, if the base station transmits certain tones on a particular channel while the receiver is turned on and tuned to that channel, such tones are detected by the tone detector 54, the output DT thereof thereby becoming positive. This triggers the 8-second monostable 10 which, thereupon, makes the scan control output on NOR gate 18 negative, whereby scanning is terminated for the duration of the eight seconds. If, during this eight-second period, the base station should transmit tones, the receiver will remain tuned to the same channel until eight seconds after the base station stops repeating the transmission of the tones.

If, at any time, the scan button switch 56, which is connected to a pulldown resistor 57, is pressed, a 30-second monostable 58 is activated. This operates a relay 60 interposed in the line connecting four light-emitting diodes 62, 64, 66 and 68 to crystal switches, such as indicated at 70, whereby the diodes serve to indicate the present conditions of circuits connected to the crystal switches. The pulldown resistor 57 makes the lower terminal of scan switch 56 negative when the switch is in an open condition.

The present system includes a clock system consisting of an oscillator 72 and counters 74, 76, and 77, the latter also being a divide-by-three circuit. These are used to provide various frequencies to the system. For example, the oscillator shown at 72 may be a 1 MHz crystal oscillator which is counted down by powers of 2 to provide the respective frequencies of 3906 Hz, 488 Hz, 61 Hz, 4 Hz and 1 Hz. In addition, the frequency of 3906 Hz is divided by 3 by the divide-by-three circuit 77 and is then counted down by powers of 2 to provide 651 Hz and 20 Hz. The following Table 1 shows the operation of the countdown system:

TABLE 1

| COUNT | FREQUENCY | | PERIOD | |
|---|---|---|---|---|
| $2^0$ | 1,000 | kHz | 1 | uS |
| $2^1$ | 500 | " | 22 | " |
| $2^2$ | 250 | " | 4 | " |

TABLE 1-continued

| COUNT | FREQUENCY | | PERIOD | |
|---|---|---|---|---|
| $2^3$ | 125 | " | 8 | " |
| $2^4$ | 62.5 | " | 16 | " |
| $2^5$ | 31.25 | " | 32 | " |
| $2^6$ | 16 | " | 64 | " |
| $2^7$ | 7,812 | Hz | 128 | " |
| $2^8$ | 3,906 | " | 256 | " |
| $2^9$ | 1,953 | " | 512 | " |
| $2^{10}$ | 977 | " | 1,024 | " |
| $2^{11}$ | 488 | " | 2,048 | " |
| $2^{12}$ | 244 | " | 4,096 | " |
| $2^{13}$ | 122 | " | 8,192 | " |
| $2^{14}$ | 61 | " | 16 | mS |
| $2^{15}$ | 30.5 | " | 33 | " |
| $2^{16}$ | 15.25 | " | 66 | " |
| $2^{17}$ | 8 | " | 131 | " |
| $2^{18}$ | 4 | " | 262 | " |
| $2^{19}$ | 2 | " | 524 | " |
| $2^{20}$ | 0.95 | " | 1.05 | S |
| $2^{21}$ | 0.48 | " | 2.1 | " |
| $2^{22}$ | 0.24 | " | 4.2 | " |
| $2^{23}$ | 0.12 | " | 8.4 | " |
| $2^{24}$ | 0.06 | " | 17 | " |
| $2^{25}$ | 0.03 | " | 34 | " |
| $2^{26}$ | 0.015 | " | 67 | " |
| $2^8/3$ | 1,302 | " | 768 | uS |
| $2^9/3$ | 651 | " | 1.5 | mS |
| $2^{10}/3$ | 326 | " | 3.1 | " |
| $2^{11}/3$ | 163 | " | 6.1 | " |
| $2^{12}/3$ | 81 | " | 12 | " |
| $2^{13}/3$ | 41 | " | 25 | " |
| $2^{14}/3$ | 20 | " | 49 | " |

The 61 Hz frequency is used for counting by the counter 28, while the other frequencies are used for annunciation.

Whenever, the scan control line, SC, leading from NOR gate 18, is positive, indicating that scanning is taking place, and while the hook switch line $\overline{HS}$ is negative, indicating that the handset has been removed and the scanning system is searching for a free channel, AND gate 78 passes 1 Hz through OR gate 80 to modulate 488 Hz and 651 Hz frequencies via AND gate 82. The output of gate 82, indicated as MT, is applied through a resistor 83 to the line C of the handset earphone, hereinafter described, to provide a busy signal annunciation. A resistor 85 is provided between audio and C. The 488 Hz and the 651 Hz frequencies, which are derived from the 1 MHz oscillator 72, provide a close approximation of the 480 Hz and 620 Hz frequencies which are normally used as the components of "busy" and "reorder" tones. In this manner, a busy signal is heard until a free channel is found and seized, at which time, the busy signal is discontinued because the scan control line SC becomes negative, thereby disabling gate 78. The resistors 83 and 85 are mixing resistors to prevent MT and audio from loading each other down, NOR is audio loaded down by C. In this manner, the audio line may be used for operating other things, such as the tone generator 54.

The connection between the subscriber phone and the base station is provided in the following manner: If the handset is off-hook, making HS negative, and a free channel has been found and seized, as indicated by SC being negative, the output of NAD gate 84 becomes positive. The output of gate 84 is differentiated at 86 to produce a short pulse that sets flip-flop 88 and also produces a pulse to activate a ½-second, non-resettable monostable 90. The output of this monostable 90 makes line ID positive and this positive signal is applied to a tone generator 92, which, thereupon sends a set of tones to the transmitter. The transmitter then sends these tones to the base station. If identified appropriately at the base station, these tones are retransmitted by the base station back to the subscriber phone, the tones being received by the subscriber phone receiver and detected by the subscriber phone tone detector 54, which, thereupon, sends a positive signal, indicated at DT. If line DT becomes positive while the output of the ½-second monostable 90 is positive, this sets flip-flop 96, making line A positive. Line A provides power to the handset, thereby activating it. The resistors 89, 91, 93 and 95 in the transmitter audio circuit are combining resistors to insure that the various components do not load each other down.

The short pulse eminating from differentiator 86 sets flip-flop 88, making line RR positive. This signal RR is applied to AND gate 98, together with the 4 Hz frequency, to provide an output which is applied to OR gate 80 to modulate the 488 Hz and 651 Hz frequencies on the input of AND gate 82. In this manner, a reorder tone, which is the same as the busy tone, but four times faster, is passed to the earphone.

If the appropriate tones are received from the base station, making the output of AND gate 94 positive, then the output of OR gate 100, connected to gate 94 becomes positive, thereby resetting flip-flop 88 so that the reorder tone is never actually heard. However, if the base station does not return the appropriate tones, flip-flop 88 will not be reset and a reorder tone will be heard in the earphone, thereby indicating that the base station did not complete the connection with the subscriber phone. There would also be no connection if the subscriber phone was out of range of the base station since, in that event, the base station would not receive any tones to retransmit.

Replacing the handset on-hook resets the flip-flop 96, thereby disabling the handset, and, via OR gate 100, resets flip-flop 88, if not already reset, thereby terminating the reorder tone to prevent its continuation after hang-up.

A 2-second pulse from the monostable 12 is passed through line DISC to the tone generator 50 in the audio transmitter circuit, which generates tones for transmission to the base station when the handset is hung up.

As an optional feature, a "confirm" button switch, such as shown at 102, and a line 104 leading into AND gate 84 may be provided. This "confirm" switch may optionally be included to satisfy present FCC regulations that require that activation of the base station must be controlled manually. This regulation is satisfied by manual operation of the "confirm" switch button after a free channel has been found and seized.

The handset, indicated generally at 106, includes four wires connecting the belt unit to the handset. Line B is the return for all other lines. Line C, as previously described, transmits annunciator signals as well as the receiver audio to the earphone 108. A tone pad 110 and a microphone 112 are combined and amplified by a preamplifier circuit, generally designated 114, which has an output D applied to the input of the transmitter. The preamplifier receives its power from line A, which is the output of flip-flop 96, whereby the tone pad and the microphone are effective only if power is provided to line A. Combining resistors 111 and 113 are provided between pad 110 and microphone 112 to prevent them from loading each other down.

If a call comes into the base station while the handset is on-hook, the base station transmits the tones associated with this particular subscriber phone. These tones are detected by tone detector 54, making line DT positive. This activates AND gate 116 which permits appropriate frequencies, representing a ringing signal, to be passed by AND gate 83, to a loudspeaker 120. Additionally, the 8-second resettable monostable 10 is triggered, which thereby stops the scanning so that the system remains tuned to the same frequency. The signal from the base station is normally repeated every six seconds so that the subscriber phone remains stopped on the same frequency. If the call is then answered by removing the handset, line $\overline{HS}$ becomes negative. Since the 8-second monostable 10 is positive, the output of OR gate 26 is positive, so that the output of AND gate 46 immediately becomes positive. This sets flip-flop 48, which holds the subscriber phone on the same frequency until the handset is placed on-hook, thereby setting the connection. If the "confirm" switch is incorporated in the system, this switch must be closed before the connection is established.

Briefly recapitulating the operation of the device, the normal monitoring condition is such that all the monostables are reset and, therefore, have negative outputs. In this condition, the scanning control line, leading from NOR gate 18, is positive and scanning takes place, the receiver being powered for one second out of each four seconds. This scanning may be observed, at will, for a period of 30 seconds each time the SCAN button 56 is pressed.

If it is desired to place a call, the handset is removed, making HS negative, whereby a busy signal is transmitted to the earphone via gates 78, 80 and 82 and via lines MT and C. In addition, scanning continues, with line RF being strobed via gates 44 and 26, the output of which, since line HS is negative, can be transmitted through gate 46 to set flip-flop 48 when a free channel is found, thereby stopping the scanning and stopping the busy signal. In the absence of the "confirm switch" the gate 84 then becomes positive, whereas when the "confirm" switch is in the system, the closing thereof causes the gate 84 to become positive. This starts the ½-second monostable 90 to transmit identification tones, which, when retransmitted by the base station within the ½-second period, are combined by gate 94 to set flip-flop 96, thereby activating the handset microphone and tone pad 110. In addition, the base station connects its transmitter and receiver to a phone line so that a dial tone is heard and dialing may then take place from the tone pad. If, for any reason, the base station does not return the proper tone, flip-flop 88 which had also been set by gate 84 becoming positive, is not reset, so that a reorder tone is heard.

If either the conversation is terminated and it is desired to dial a different number, or a reorder tone is heard, the handset may then be placed on-hook, thereby making line $\overline{HS}$ positive. This resets all of the flip-flops and activates the 4-second monostable, which prevents scanning for an additional 4 seconds, continues to keep the receiver turned on for the additional 4 seconds, and transmits a disconnect tone for 2 seconds to indicate to the base station that it should disconnect the phone line. In addition, the base station transmits a voice identification for the next 2 seconds which is relayed by the subscriber phone to the base station because line VR from monostable 12 operates the relay 52 to connect the audio output of the receiver to the audio input of the transmitter.

The term "monostable" is applied here to three different types of systems: (a) the straight or non-resettable monostable consisting of a trigger source, a flip-flop, a counter and a frequency source, (b) a resettable monostable consisting of a trigger source, a flip-flop, a gate, a counter and frequency source, and (c) what may be referred to as an alternating or delay type non-resettable monostable which consists of a source of levels, a flip-flop, an exclusive NOR gate, a counter and a frequency source.

The non-resettable monostable has a period that is independent of the number of times the monostable is activated by an input signal. Therefore, its period begins with the beginning of the first activating signal and continues for the predetermined time to conclusion. The resettable monostable operates in a manner similar to the non-resettable monostable except that it enters its unstable state at the beginning of the first input pulse and continues until its period, starting with the trailing edge of the last input pulse, concludes. The alternating non-resettable monostable, by utilizing the delay, protects against switch bounce or other large noise on the input trigger line.

The actual logic used in the above-described system is illustrated in FIGS. 2A and 2B and 3A and 3B. The 8-second monostable, shown at 10 in FIG. 1, comprises NOR gates 130, 132, and 134 plus counter 138 shown in FIG. 2A. The 4-second monostable shown at 12 in FIG. 1, comprises NOR gate 140, NOR gate 142, exclusive NOR gate 144, counter 148, NOR gate 152 and NAND gate 154. Gates 140 and 142 constitutes a flip-flop.

In operation, when line $\overline{HS}$ becomes negative, the input line 156 to gate 144 becomes positive. Since the input line 158 is also positive, the input line 160 of the counter 148 becomes positive, thereby enabling the counter 148 to count 30-Hz pulses from the clock system until such time as the $2^8$ power output of the counter, shown at 162, becomes different from the input line 156 of gate 144, at which time the counter is again disabled. Since during that period the output 162 of counter 148 is positive, no output is produced via gate 152 to line VR. Similarly, since the output of gate 142 is negative, the output of gate 154 remains positive. If the hook switch should bounce, the 4-second period merely takes a little longer.

When the handset is placed on-hook, making line $\overline{HS}$ positive, the inputs of the exclusive NOR gate again become the same, thereby enabling the counter, which then continues to count until the inputs differ from each other. However, this time, the output 162 of the counter is negative so that when $2^7$ output from the counter, indicated at 164, becomes positive, gate 152 is activated to operate the voice relay hereinafter described. In addition, since the output of gate 142 is now positive, gate 154 becomes negative when the output 164 of the counter is negative, so that line $\overline{DISC}$ becomes negative for the purpose of transmitting tones. A NOR gate 166, which corresponds to gate 18 of FIG. 1, is connected to the counter 168, corresponding to the counter 28 of FIG. 1, to prevent scanning thereby.

At the same time, the output of gate 142 is transmitted to a transistor 200 via a diode OR gate consisting of diodes 172 and 174 and resistors 176 and 178, whereby negative power is supplied by the collector of transistor 200 to the receiver. The output of the diode OR gate is also connected to a gate 202, acting as an inverter, the output of which is connected via resistor 171 to the base of a transistor 170, the collector of which supplies positive power to the receiver. The output of inverter 202 is also connected so as to enable a decoder 210.

NOR gate 180 and NOR gate 182 perform the functions of gates 26 and 40 of FIG. 1, while NOR gates 184 and 186 represent the flip-flop 48 of FIG. 1.

A separate strobe line is not actually used in this system. Instead, the $2^2$, $2^3$ and $2^6$ outputs of counter 168, which are respectively indicated at 188, 190 and 192, are combined directly with line $\overline{RF}$ and AND gate 194 to perform the function of the strobe and of the gate 44 shown in FIG. 1. A NAND gate 196 combines the two outputs, indicated at $2^7$ and $2^8$ in counter 168, to produce an output from the gate one-fourth of the time, thereby providing the 25% scanning ratio. In addition, NAND gate 198 plus the diode OR gate 172-174 perform the function of gate 22 of FIG. 1, which activates the transistor 200 to provide negative power to the receiver. The output of the diode gate is, furthermore, inverted by NAND gate 202, operating solely as an inverter, to turn on the transistor 170, whereby positive power is supplied to the receiver.

The counter 168 counts in binary, and the $2^4$ and $2^5$ outputs thereof, respectively designated 206 and 208, are decoded by the decoder 210 to provide the scanning functions of the crystal switches herein after described. If decoder 210 were to remain enabled, the crystal switches would be scanned as a continuous function; therefore, unlike the simplified showing FIG. 1, when the handset is taken off-hook, the hook switch being indicated at 212, making $\overline{HS}$ negative, the decoder 210 is enabled on a continuous basis, whereby a free channel can be found immediately rather than after a wait of 3 seconds.

Decoder 214, having current limiting resistors 215 connected to respective light-emitting diodes 217, is connected to counter 168 in parallel with decoder 210; however, decoder 214 is enabled by a monostable consisting of NOR gates 216 and 218, acting as a flip-flop, plus counter 220, so that when the scan button, shown at 222, is pressed, the flip-flop 216, 218 and counter 220 are enabled. The resistor 223 is a pulldown resistor. This operates a set of LED's in synchronism with the crystal switches until the counter 220 counts 61 Hz divided by $2^{11}$, at which time, the flip-flop is reset. The line here is connected to the $2^{12}$ output, but because the flip-flop is reset when the line goes positive, which occurs halfway through the $2^{12}$ cycle, the division is only by the $2^{11}$ count rather than by the $2^{12}$ count. If it is desired to scan only two channels instead of four, as disclosed, the connections to decoder 210 may be modified by reconnecting the pin connecting line 208 to the positive supply permanently.

It is to be noted that the 30-second monostable, shown at 58 in FIG. 1, which, as described above, consists of NOR gates 216 and 218 plus counter 220, could be equally effective if it were made a resettable monostable; however, by making it a non-resettable monostable, it requires less gates.

AND gate 224, OR gate 226 and AND gate 228 correspond to the respective gates 78, 80 and 82 of FIG. 1, and are used to provide a busy signal in the manner previously described. AND gates 230 and 232 correspond to gates 116 and 83 of FIG. 1 to provide a ringing signal to loudspeaker 120, as previously described. The resistor 233 is a current-limiting or gain or loudness-adjust resistor. NOR gate 234, followed by the differentiator consisting of capacitor 236, resistor 238 and resistor 240, correspond to the gate 84 and differentiator 86 of FIG. 1. The combination of flip-flop 88 and gate 100 of FIG. 1 corresponds to the NOR gate 242 and NOR gate 244. The AND gate 246, in combination with OR gate 226 and AND gate 228, correspond to the combination of gates 98, 80 and 82 of FIG. 1 to provide a reorder tone, previously described.

The ½-second non-resettable monostable 90 of FIG. 1 comprises a flip-flop consisting of NOR gates 248 and 250 plus counter 252. When triggered, the output of gate 248 makes line ID positive to generate tones, as hereinafter described. In addition, line DT is inverted by NOR gate 130 to become line $\overline{DT}$, which is then combined with the output of gate 250 by NOR gate 254 to perform the operation of gate 94 of FIG. 1 whereby it sets the flip-flop 96. The flip-flop 96 comprises NOR gates 256 and 258 in FIG. 2. The output of gate 258 is passed by NOR gate 260 via diode 262 to line A when no identification is being transmitted, which occurs when line ID is negative. In this manner unlike the simplified showing in FIG. 1, the handset is not activated until the transmission of the identification tones is complete.

As shown in FIGS. 3 and 3A, the clock system comprises an oscillator with an amplifier section consisting of an integrated circuit 264, to which is connected an exclusive OR gate 263, acting as an inverter, and diodes 265 which serve to decouple the various inputs, plus a 1 MHz crystal 266 in parallel with a resistor 267, which provides bias for the interval amplifier in the circuit 264. Since integrated circuit 264 is unable to operate from the complete power supply voltages, it operates from half a power supply less the drops of diodes 268, 270, 272 and 274. Since the output of the oscillator is of insufficient amplitude to operate counter 276, it is amplified by transistor 278 plus its associated components.

A capacitor 275 and a resistor 277 provide standard resistor-capacitor coupling from the oscillator output to the transistor 278, while resistor 279 is a load resistor which discharges the inherent capacitance of transistor 278. If the input of counter 276 and oscillator 264 operate from the same supply voltage, components 275, 277, 278 and 279 are not necessary when the oscillator amplifier output of 264 would be connected directly to the clock input of counter 276.

Counter 74 of FIG. 1 consists of counters 276 and 280. The divide-by-three circuit 77 of FIG. 1 comprises exclusive OR gate 282 plus flip-flops 284 and 286. The divide-by-three function could also be made up of an appropriate integrated circuit appropriately connected. Counter 228 performs the same function as counter 76 of FIG. 1. It is to be noted that counter 74 of FIG. 1 could consist only of one counter instead of the two shown at 276 and 280; however, two counters are shown here because the presently commercially available integrated circuits only include counts to $2^{14}$.

Since the base station is able to identify the particular subscriber phone units it is in communication with during the connection therewith, the two tones used for disconnect could be the same for all units. In the present instance, the two tones selected are those conveniently produced by integrated circuit 264. During the connection function, however, a different pair of tones is required for each unit, which requires a different pair of oscillators, which, in turn, require a rather large amount of current. Therefore, since it is never required to transmit the identification tones except when the handset is off-hook and prior to connection being completed, as indicated by line A becoming positive to activate the handset, an appropriate NOR gate 290 is connected to line $\overline{HS}$ and to line A (which is here indicated as "HP"), whereby the output of gate 290 provides negative power to the oscillators through gates 291 and 293. The diodes 292 and 294 serve to decouple reversed voltages from the integrated circuit amplifiers hereinafter described.

The oscillators comprise narrow band pass filters consisting of electrically-excited crystal and tuning fork elements shown at 296 and 298, plus their associated components, which include resistors 279 and 299 and integrated circuit amplifiers 300 and 302. The resistor 297 is a current-limiting resistor, while the resistor 299 serves to prevent the low-impedance inverting input of amplifier 300 from loading down the fork and destroying its Q. The resistor 301 is a feedback resistor which, in conjunction with the resistor 299 and the resistor 303, determines the closed-loop gain of the amplifier 300 at the frequency of oscillation. The resistor values are selected such that the oscillators always operate with the amplifiers in saturation, whereby a constant-amplitude output is always provided.

The capacitors 305 and 307 provide roll-off compensation so that the amplifier does not self-oscillate.

It is preferable and, generally, necessary, to transmit both tones at the same amplitude in order that the base station may detect both tones. Resistors 304 and 306 plus capacitor 308 act as a low-pass filter to filter out all hamonics so that only the fundamental frequencies of the oscillators remain. The outputs of the oscillators are keyed by forward and reverse biasing diode 310 by making line ID negative or positive, as required. The positive channel portion of complimentary MOS usually has less resistance than the negative portion, so that the paralleling of gates 292 and 294 provides a resistance similar to that of gate 290 when activated.

The outputs of the oscillators are coupled through resistor 312 to the audio input of the transmitter, while the tone outputs of integrated circuit 264 are coupled through resistors 314 and 316 and capacitor 318 to the audio input of the transmitter.

For voice identification purposes, the audio output of the receiver is coupled through an attenuator consisting of resistors 320 and 322 and the contacts of relay 324 to the audio input of the transmitter. Provision for external audio and data to the input of the transmitter is provided by a jack and resistor 326. The audio output of the receiver is passed via resistor 328 and line C to the earphone in the handset. Busy and reorder tones produced by AND gate 228 (FIG. 2) are coupled by line MT through capacitor 330 and resistor 332 to the earphone via line C.

An important aspect of the present invention is the type of tone detector used. This tone detector basically comprises a transistor with a collector load resistor, a biasing network that is DC referenced to the collector supply voltage potential and AC referenced to the transistor's emitter, a peak-detector consisting of a diode, a capacitor, a resistor and a high-impedance or low leakage threshold means, and an input coupling capacitor. Such a detector distinguishes between the presence of a steady voltage and a varying voltage, while, when the input coupling capacitor is substituted by a filter, the detector then detects the presence or absence of particular frequencies.

Specifically, as shown here, electrically-excited crystal and tuning fork resonators 334 and 336, plus their associated components, act as tone detectors. They are identical so that a description of one will serve as a description of the other. In this respect, transistor 338 is lightly biased on by resistor 340, thereby making the collector of transistor 338 positive and reverse biasing the diode 342. This permits resistor 344 to discharge capacitor 346. The resistor 340 is connected to a decoupling network including resistor 339 and capacitor 341. A pulldown resistor 347 is also provided for the transistor 338. The input pin of NOR gate 348 is of extremely high impedance, as compared to the resistance of resistor 344. Therefore, since the input pin of gate 348 is positive, the output pin thereof is negative. When a signal is received by the receiver, the audio is passed via resistor 350 to element 334. If the signal from the receiver contains a frequency that is the same as the resonant frequency of element 334, that frequency will be passed by element 334 to the base of transistor 338, which then reproduces that frequency as a square wave on its collector. At this time, diode 342 and capacitor 346 act as a peak detector, thereby fully charging capacitor 346 and making the input therefrom into gate 348 negative. If both tones represented by elements 334 and 336 are present, then both input pins of gate 348 will become negative so that line DT can become positive, thereby indicating that both tones were received.

The receiver contains a phase-locked loop, the error voltage of which is essentially constant but of indeterminate amplitude when a carrier is present within the pass band of the receiver. When no carrier is present, the error voltage is either oscillatory or consists of noise.

Transistor 352 and its associated components constitute a detector which operates in substantially the same manner as transistor 338 and its associated components, described above. However, capacitor 354 is added so that if a carrier is present, only DC current is present on the line PLL. Transistor 352 is lightly biased by the resistors 355 and 356 of the decoupling network, while resistor 357 acts as a pullup load resistor for the transistor. The decoupling resistors also act to charge the capacitor 354. The bias makes the line $\overline{RF}$ negative. If a carrier is not present, then the oscillations or noise on line PLL are passed by the capacitor 354 and reproduced as saturated signals on the collector of transistor 352 so that line $\overline{RF}$ becomes positive.

Figure 3B:
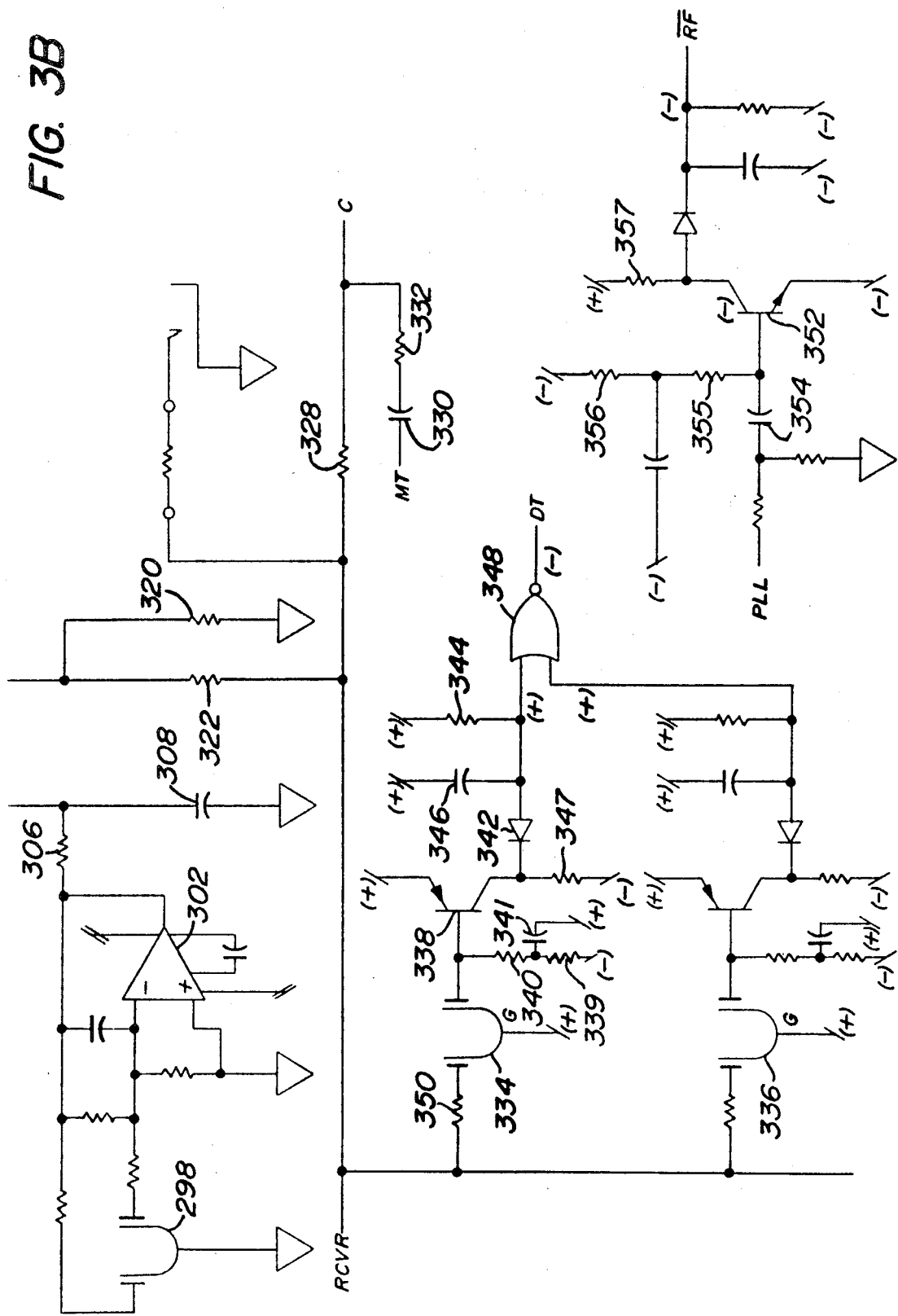

The various unnumbered components in FIG. 3B, such as resistors, capacitors, diodes, decoupling networks, etc. serve the same purpose as the corresponding parts described elsewhere in FIGS. 3A and 3B.

Figure 4:
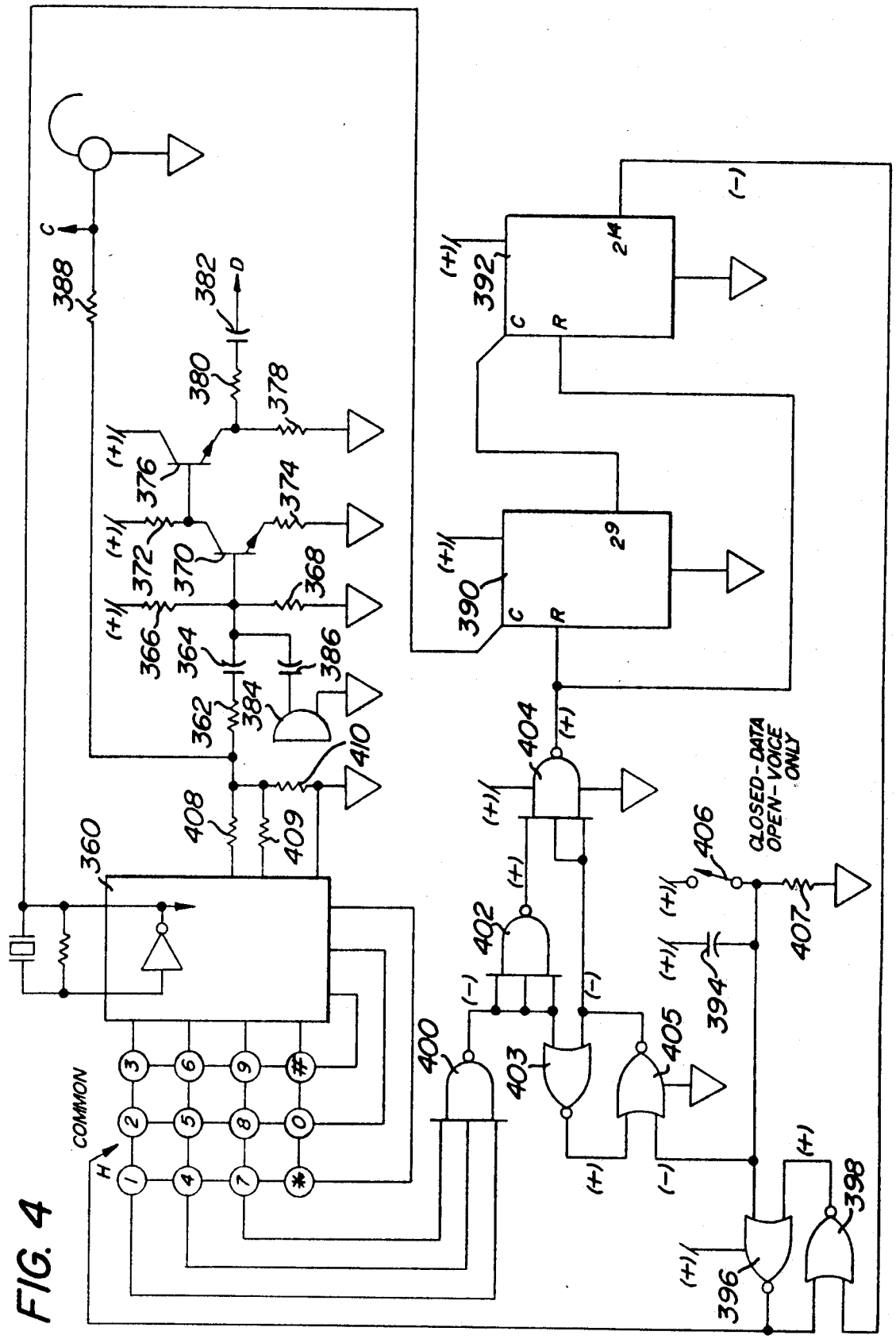
FIG. 4 is a schematic view of the handset circuitry embodying the present invention.

The handset used in this system is exemplified in FIG. 4 and comprises a standard set of twelve buttons connected to a tone-generating integrated circuit 360 which produces appropriate tone frequencies that are mixed and attenuated by resistors 408, 409 and 410 and then combined with the output of microphone 384 by a resistor 362, capacitor 364 and capacitor 386. The resultant signals are then amplified by a standard transistor amplifier consisting of biasing resistors 336 and 368, transistor 370 and gain-determining resistors 372 and 374, the output of which is coupled through the emitter-follower configuration consisting of transistor 376 and resistor 378, and thence through resistor 380 and capacitor 382 to line D. Additionally, side tone is provided to the earphone by coupling the attenuated voltage appearing across resistor 410 through a resistor 388 to the earphone.

As an optional feature, in order to prevent actuation of the device by inadvertant depression of any pushbutton when grasping the handset, a system may be included which is embodied by the lower portion of FIG. 4. In this system, the crystal-controlled oscillator unit 360 is counted down by a factor of $2^{33}$ by counters 390 and 392 operating in cascade. The counter 390 has a $2^9$ output and the counter 392 has a $2^{14}$ output. When power is initially supplied to the handset via line A (note FIG. 1 and 2), the capacitor 394 is in a discharged condition, so that the input of the flip-flop unit formed by NOR gates 396 and 398 is positive, thereby resetting the flip-flop. This makes the common for the pushbutton negative. When a pushbutton is pressed, the output of the NAND gate 400 is made positive. This output is inverted by NAND gate 402 and applied to NAND gate 404 to make the reset input of the counters 390 and 392 negative so that the counters count. The gates 402 and 404, plus NOR gates 403 and 405, plus counters 390 and 392, comprise, in essence, a resettable monostable, whereby each time a button is pressed, the monostable is reset. If however, no button is pressed for a duration of 4 seconds, then the $2^{14}$ output of counter 392 sets the flip-flop comprising gates 396 and 398 making the common of the pushbuttons positive, so that no further tones can occur.

In order for the pushbuttons to be capable of transmitting data when so desired, a switch 406 is provided to short out the capacitor 394, making the common negative, so that the buttons can be used to transmit data after dialing. A resistor 407 is connected to the switch 406 and serves to start the capacitor 394 in a discharged condition and subsequently charges it.

Figure 5:
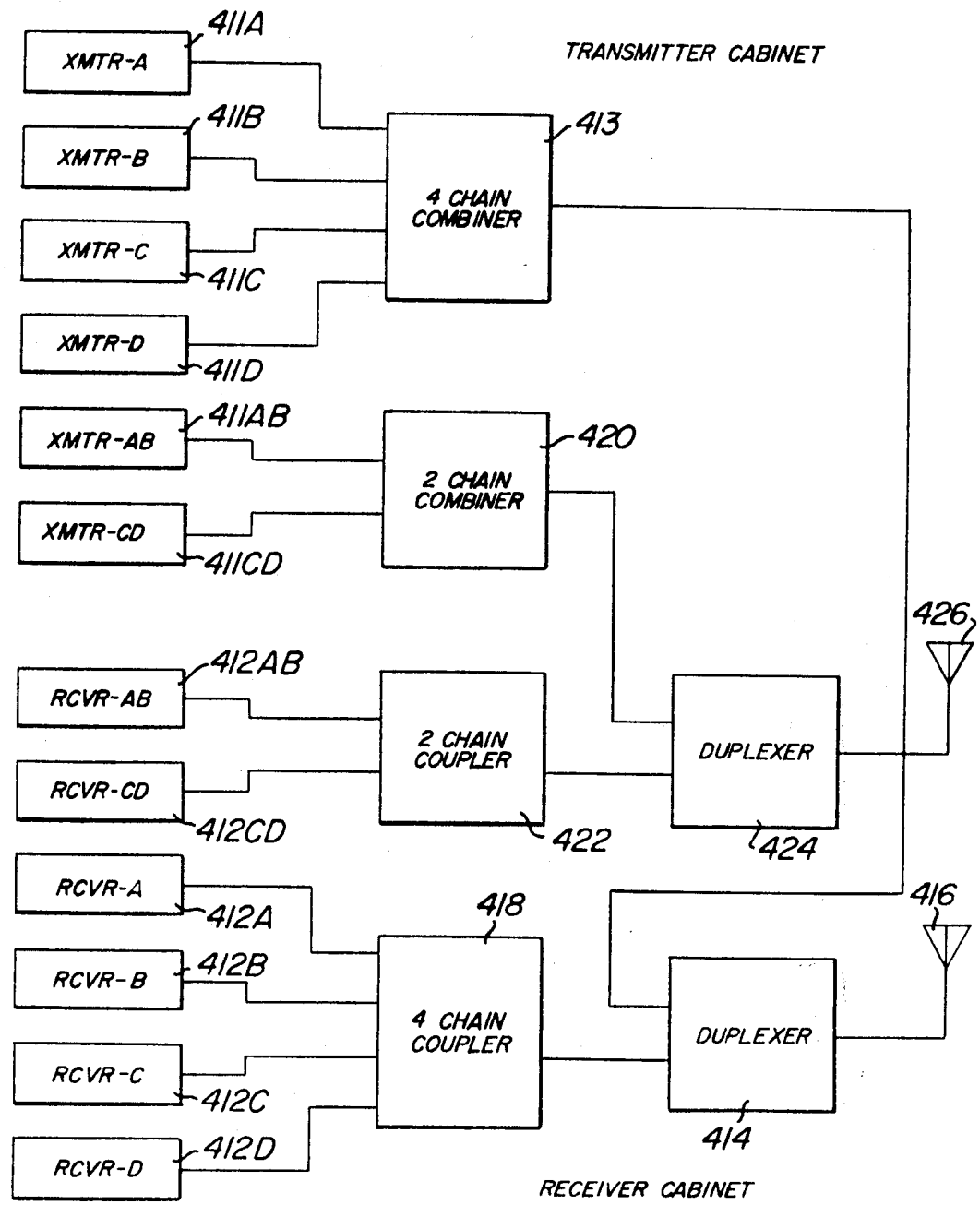
FIG. 5 is a block diagrammatic view of a base station embodying the present invention.

In FIG. 5, there is shown, a block diagram of the ratio frequency portion of the base station system. There are six transmitters designated, respectively, as 411 A, 411 B, 411 C, 411 D, 411 AB and 411 CD, and six receivers designated, respectively, 412 AB, 412 DC, 412 A, 412 B, 412 C and 412 D, made up of one group of four of each and another group of two of each. This is, in effect two separate base stations, one capable of operation with four channels and the other capable of operation with two channels. The four-channel transmitters are here limited to 3-watts input power and are referred to as the low power station, while the two-channel transmitters are limited to 60-watts input power and are referred to as the high power station.

The four-transmitter outputs A, B, C, and D are combined by a standard, four-channel combiner network 413, the output of which is fed through a duplexer 414 to an antenna 416. Similarly, signals are received by the antenna, these signals being passed by the duplexer to a standard four-channel coupler 418 which consists of a preamplifier followed by a division network. The outputs of the coupler are then fed to the four receivers 412 A, B, C and D. The duplexer 414 is also a standard device which is characterized by the fact that signals originating from the combiner pass to the antenna but not the coupler, whereas signals coming into the antenna are coupled to the coupler but not to the combiner.

The two-channel, high-power station operates through combiner 420 and coupler 422, duplexer 424 and antenna 426 in a similar manner to the above, whereby, for a particular station, all of the receivers and transmitters are connected to one antenna.

In general, the base station supervisory logic is identical for each transmitter-receiver pair and is duplicated four times for the four-channel station. The subscriber unit is not tuned to any particular channel but simply scans the channels and stops on whichever channel is free, so that it utilizes the same logic with any channel with which it interfaces.

Figure 6:
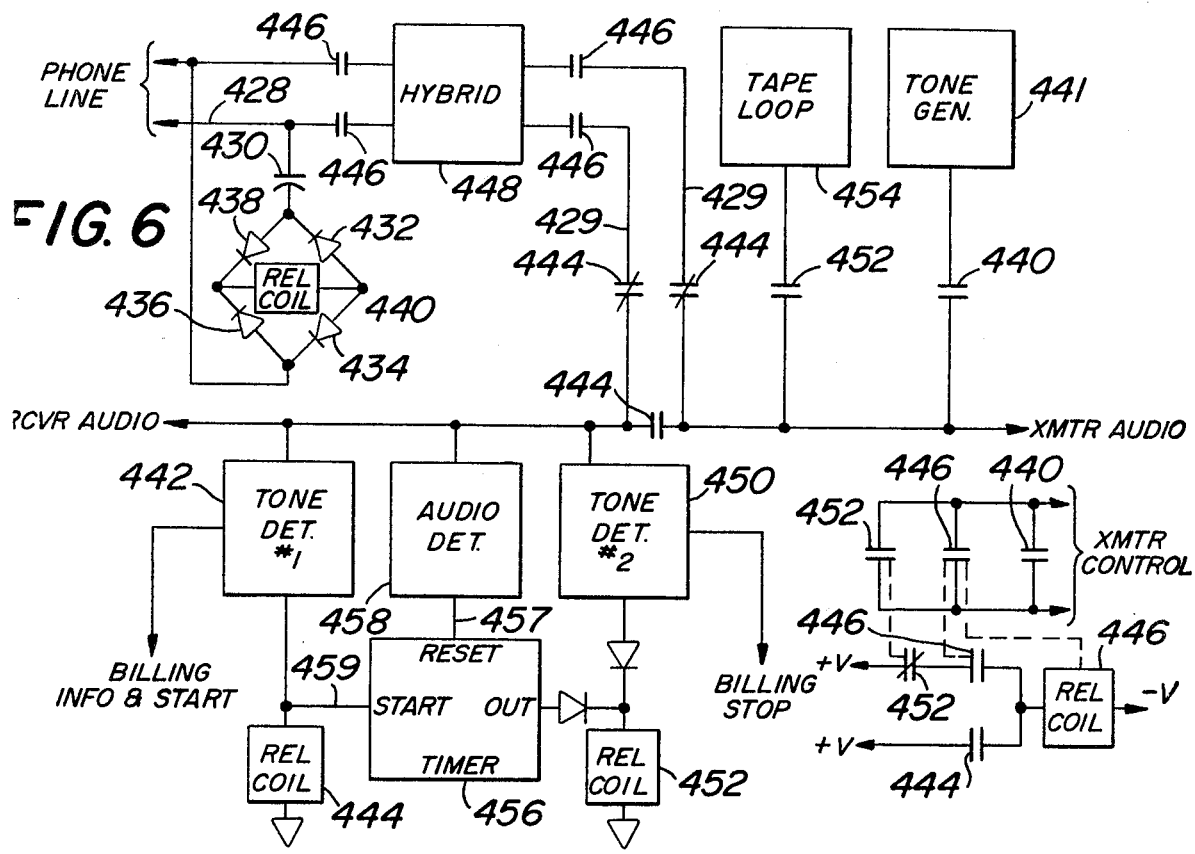
FIG. 6 is a schematic view of the system for each channel of the base station.

The following description, provided in conjunction with FIG. 6, relates to one complete channel and serves as a description of all the channels. The logic, as described, is identical for both incoming and outgoing calls, with the exception of the ringing function described hereinafter. In this description, for the four-channel base station, there are four phone lines, each with a separate telephone number and each associated with a transmitter-receiver pair. In this figure as well as subsequent figures, the coils of the various relays are shown by rectangular boxes while the closed or open contacts of the same relays are indicated by parallel lines, either with or without a diagonal line to indicate normally closed or normally open positions. The relay coils and relay contacts of the same relay are designated by the same reference characters.

The telephone line 248 is connected to a detector for detecting ringing signals which consists of a capacitor 430, four diodes 432, 434, 436 and 438 and a relay 440. When a ringing signal comes down the telephone line, the relay 440 operates for two seconds. One contact of the relay 440 turns on the transmitter while the other contact connects the output of a tone generator 441 to the transmitter audio input. The tone generator generates two tones which, when detected by the subscriber unit, will stop the subscriber unit on a particular channel, and, in addition, a ringing signal will be emitted by loudspeaker. In this manner, when an incoming call is being received, the transmitter will transmit the appropriate pair of tones for two seconds out of each six seconds if there is a ringing signal on the phone line for such two seconds.

In operation, when the subscriber picks up the handset, in the case where the "confirm" button is not used (where it is used, he presses it after removing the handset), this operates the monostable 12 which causes generation and transmission of a pair of tones for ½ second. The base station supervisory logic uses tone detector 442 to constantly monitor the receiver audio output, so that, when it detects the proper pair of tones, it operates relay 444, which, in turn, causes normally open relay 446 to operate. This turns on the transmitter and connects the receiver audio output to the transmitter audio input so that the two tones caused to be generated by the monostable 12 are retransmitted back thereto. The monostable 12 then detects its own pair of tones and activates the system. The relay 444 is provided with normally closed contacts in the two lines 429 and a normally open contact in the line between the receiver audio and transmitter audio. When the transmitter stops transmitting at the end of the ½ second, the tone detector 442 releases the relay 444, whereby the transmitter audio input is no longer connected to the audio output of the receiver. However, relay 446 electrically locks itself closed so that the transmitter stays on and, in addition, relay 446 connects a hybrid 448 to the phone line and, through the normally closed contacts of relay 444, which has now dropped out, to the receiver audio output and the transmitter audio input. The hybrid 448 is a standard device (manufactured by "Mobile Communications") and is similar to a duplexer except that it applies to audio whereas the duplexer applies to radio signals. In this manner, any audio from the receiver is passed into the phone line but is not passed to the transmitter, while audio from the phone line is passed to the transmitter. In this manner, there is no feedback because the loop is not completed from the subscriber microphone to the transmitter, then to the base receiver, then to the phone line, then to the base transmitter, then to the subscriber receiver, then to the subscriber earphone and then acoustically back to the subscriber microphone, the link being broken by the hybrid. The hybrid also contains a DC resistance so that, when relay 446 operates, the phone line is taken off-hook. The subscriber can now dial, converse, transmit data, etc.

When the subscriber completes the call, he hangs up the handset, which causes the phone to transmit a second pair of tones. These tones are detected by the tone detector 450, which operates relay 452. The relay 452 thereupon causes relay 446 to drop out. However, another set of contacts of relay 452 continues to keep the transmitter turned on, while a third set of contacts of relay 452 connects the output of a tape loop 454 to the transmitter audio input. The tape loop contains the station call sign which is repeated continuously by the loop so that when relay 452 operates, the call sign that is transmitted by the base station is received by the subscriber phone and is retransmitted thereby. In this manner, at the conclusion of any conversation, when the subscriber hangs up, the station is identified by voice on both frequencies.

If, during a conversation, the subscriber unit moves out of range of the base station, or, if, for any other reason, the subscriber unit does not transmit disconnect tones, this would normally leave the base station transmitter turned on and connected to the subscriber unit so that it would be continuously transmitting to the subscriber unit. This would unnecessarily tie up the channel even though it is not in actual use. To obviate this, when the tone detector 442 is actuated, it starts a timer 456 which can be set for an arbitrary amount of time, such as one minute. When the timer finishes timing, it operates relay 452 which initiates the shutdown procedure described above. On the other hand, if the subscriber unit remains in range, the speech therefrom is detected by an audio detector 458, and each time the speech is detected, the timer 456 is reset so that the conversation can continue without being cut off. However, if the speech is discontinued for more than the pre-set time (i.e. one minute) or if the speech is not received for any other reason for this length of time, the base station will be automatically shut off.

Since each subscriber unit transmits a different pair of tones, the tone detector 442 is arranged to detect many different tones and to actuate relay 444 only for those pairs of tones which are currently valid. Those which are not valid, can be deleted so that if, for example, the subscriber does not pay his bill, he cannot use the phone. In addition, tone detector 442 has additional outputs which indicate which subscriber unit is currently using the base station, which outputs can be used to record on paper or magnetic tape, or on any other desired storage medium, the usage of the base station by the subscriber unit. The output of tone detector 442 can also be used to start a clock running which is stopped by tone detector 450, such time information being storable for billing purposes. In addition, a tone decoder may be coupled to the receiver audio and the output thereof can be entered into the storage medium to indicate what telephone number was called by the subscriber unit, whereby, when the base station owner receives a bill from the telephone company, he can sort out and pass the charges on to the individual subscriber. All of this information may, if desired, be put into a computer to automatically print bills.

Briefly stated, in the subscriber unit of the present invention the various supervisory signals such as "busy" and "reorder", are generated by combining those frequencies by means of gates rather than resistors or amplifiers, the gates being used, in essence, as modulators to produce the composite tones. This is also done for the ringing signal. In this respect, an exclusive OR gate may be used as a modulator in that such a gate is, in essence, a saturated phase detector or modulator.

Base Station Supervisory Logic

Figure 7:
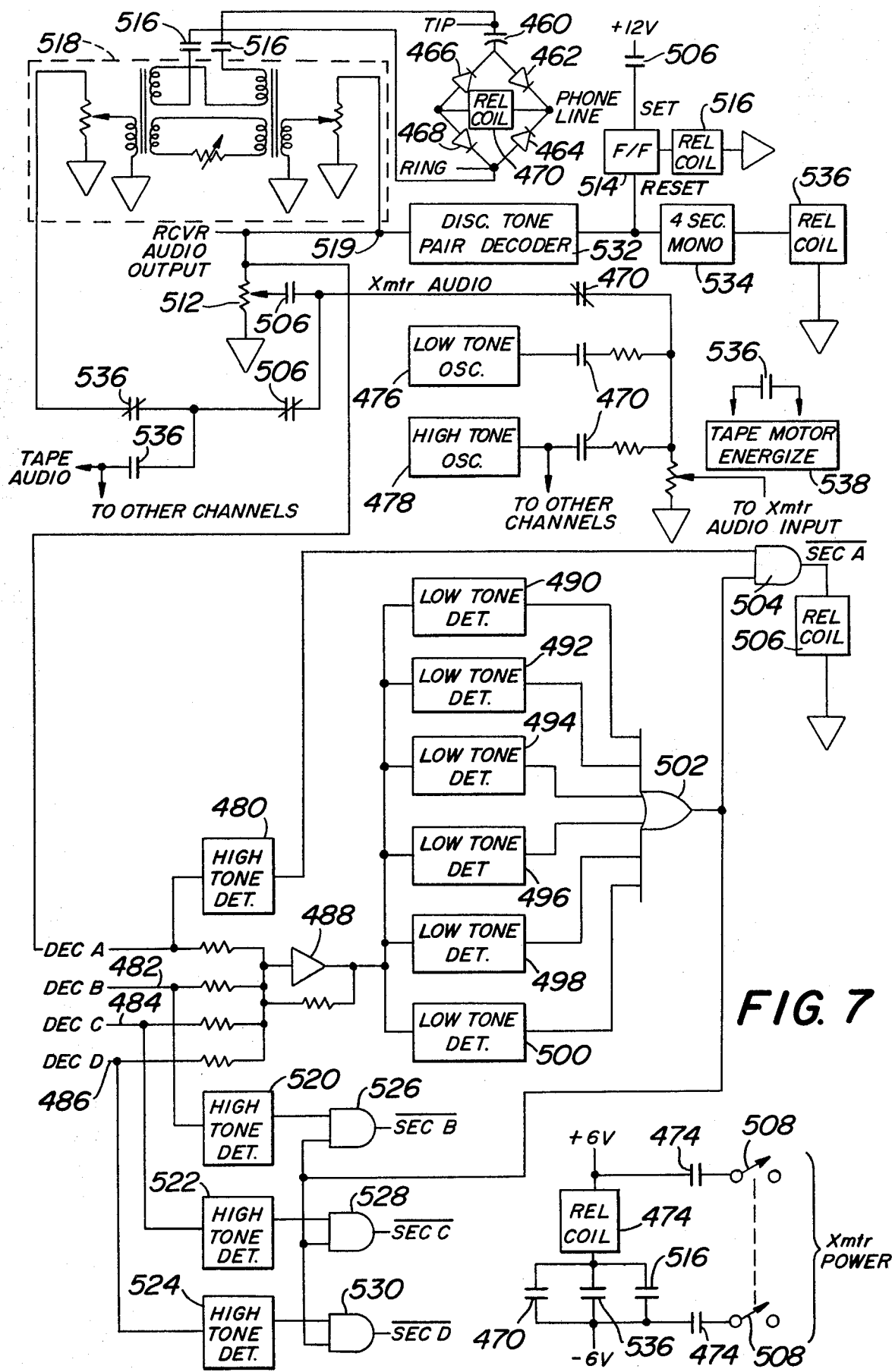
FIG. 7 is a schematic view of the base station supervisory logic used in the present invention.

FIG. 7 is a more detailed schematic illustration of the base station supervisory logic for one channel, it being understood that the same logic applies to each of the channels utilized in the system.

As shown, a ringing signal may appear between the tip and ring wires of the phone line, which is connected solely through a capacitor 460 and diodes 462, 464, 466 and 468 to a relay 470. Relay 470 is a sensitive relay and has a high impedance coil, so that it does not load down the telephone line. One contact of relay 470 causes a relay 474 to operate to supply power to the transmitter. Other contacts of relay 470 disconnect the audio input of the transmitter from anything else and connect the outputs from a low tone oscillator 476 and a high tone oscillator 478 to the audio input of the transmitter.

In this manner, when a ringing signal causes relay 470 to operate, during the time that the ringing signal is on the line (normally about 2 seconds), the transmitter is powered and transmits a pair of tones. The higher of the two tones is always the same, while the lower of the two tones designates the particular subscriber unit being called.

Subsequent operation is the same whether the subscriber unit is making an outgoing call or receiving an incoming call. In either case, the subscriber unit transmits two tones (a low tone and a high tone) for about one-half second. The tones are received by the receiver and appear at the receiver audio output, which passes them to a high tone detector 480 that indicates to the logic which channel is being used. The tones are also combined with any tones appearing on other channels by a summing amplifier system comprising lines 482, 484 and 486 and an amplifier 488, and the sum is passed to a set of six low tone detectors indicated at 490, 492, 494, 496, 498 and 500. If any low tone is detected, the output of an OR gate 502 is combined with the output of the high tone detector 480 by an AND gate 504 to operate a relay 506.

A contact of relay 506 sets flip-flop 514 which operates relay 516 on a continuous basis until the flip-flop is reset. A set of contacts on relay 516 operates relay 474, the contacts of which connect power to the transmitter when switch 508 is closed. Additionally, another set of contacts of relay 506 connects the receiver audio output through a gain control 512 to the transmitter audio input, thereby retransmitting the tones back to the subscriber unit for interconnection ("handshake") purposes by indicating that the subscriber unit has been recognized and accepted. A set of normally closed contacts on relay 506 disconnects any other possible inputs to the transmitter audio input as long as relay 506 remains energized. In this manner, as long as the two tones are received, they are retransmitted. When the tones are no longer received, relay 507 is deenergized, thereby disconnecting the receiver audio output from the transmitter audio input and connecting the output of hybrid 518 to the transmitter audio input. Since flip-flop 514 has been set and is stable, relays 516 and 474 remain operated, supplying continuous power to the transmitter.

Another pair of contacts of relay 516 connect the telephone line to a hybrid, indicated, generally, within the broken line 518, which, in turn, is immediately connected to the receiver audio output at 519, and, upon the dropping out of relay 506, is also connected to the transmitter audio input. In this manner, the telephone line is connected via the transmitter and receiver to the subscriber unit so that the unit can answer a call or initiate a call. This connection remains until such time as the subscriber unit transmits a disconnect tone pair.

The particular high tone detector that is operated determines the channel that is used, while the particular low tone detector that is operated indicates the particular subscriber unit that is actuating the channel. For this reason, the same number of high tone detectors is required as there are channels to be used, while the same number of low tone detectors is required as there are subscriber units. In the system illustrated in FIG. 7, there are six low tone detectors previously indicated at 490-500, and four high tone detectors are used, including the detector 480, previously described, and detectors 520, 522 and 524. However, any desired number of high and low tone detectors may be used.

When all of the outputs of the high and low tone detectors are combined, a pair at a time, by AND gate 504 taken together with AND gates 526, 528 and 530, the outputs of these gates provide full specific information for billing purposes. In this respect, the detectors are combined through two input AND gates in order to maintain adequate noise rejection. When the outputs of these gates are recorded (as by a tape) and the outputs of the disconnect tone pair detectors are similarly recorded, all of the information would be on the tape that is necessary for a computer to fully automatically prepare a bill for time and charges to each customer. In this manner, while this system retains the same noise rejection as in other double-tone detection systems, it requires, in the case of large number of subscriber units, only the square root of as many detectors as would otherwise be required, thereby effecting a considerable saving in materials and cost of installation.

As described previously, when a call is completed and the subscriber handset is hung up, the unit automatically transmits a disconnect tone pair for two seconds and, for an ensuing two seconds, connects the audio output of the unit's receiver to the audio input of the unit's transmitter, after which it turns itself off. The disconnect tone pair is received by the base station receiver and detected by the disconnect tone pair decoder 532, which resets flip-flop 514, causing relay 516 to drop out. However, it also operates a four second monostable 534, which operates a relay 536 for 4 seconds, which, in turn, activates relay 474 to supply power to the transmitter, whereby the transmitter continues to stay on for an additional four seconds after relay 516 drops out. In addition, a second set of contacts of relay 536 energized the motor 538 of a tape machine, while a third set of contacts of the relay 536 connects the audio output of the tape machine to the audio input of the transmitter, while, in addition, a fourth set of normally closed contacts of relay 536 disconnects hybrid 518 from the transmitter audio input.

The tape machine contains a 2-second loop with the stations' identifying call letters recorded on it, so that the call letters are continuously repeated and transmitted during the four-second interval. Therefore, the timing at the base station need not be in synchronism with the timing in the subscriber units. At the conclusion of the four-second interval, relay 536 drops out. This, in turn, causes relay 474 to drop out, thereby removing power from the transmitter and placing the base station in the starting condition.

Description of Subscriber Unit

Figure 8:
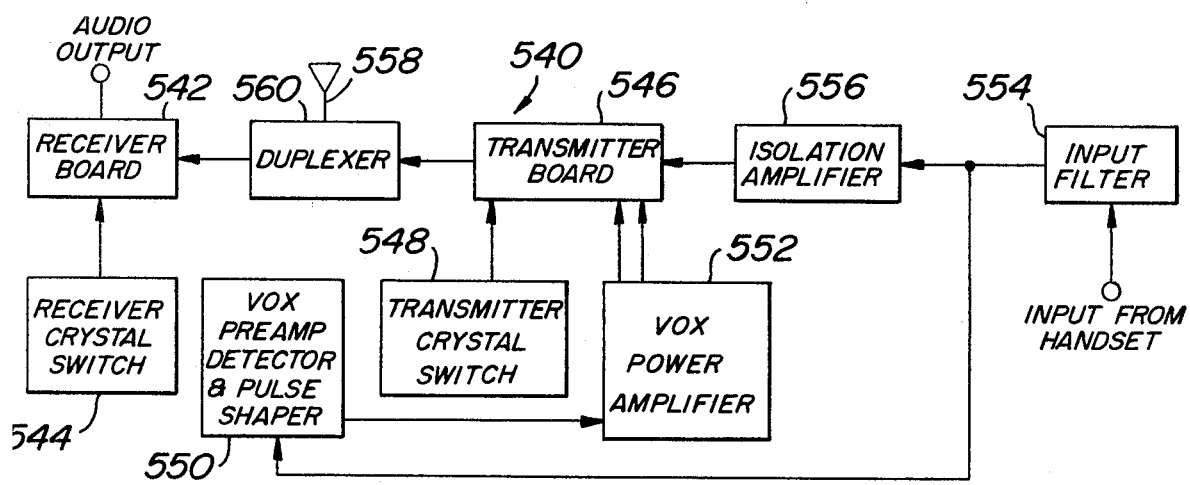
FIG. 8 is a block diagrammatic view of a subscriber phone unit embodying the present invention.

FIG. 8 is a block diagram of the subscriber unit, generally, designated 540, wherein the instrument comprises several different subunits, namely the receiver 542 with its crystal switch 544, the transmitter 546 with its crystal switch 548, the VOX system comprising the preamplifier, detector and pulse shaper, indicated at 550, and the VOX power amplifier, indicated at 552, plus the input filter, indicated at 554, which is connected to the transmitter 546 by an isolation amplifier 556.

When the instrument is turned on, the receiver is activated by the logic, previously described, to receive any incoming signals. As this is a multichannel system, means are provided to scan from one channel to the next. This is accomplished by the receiver crystal switch 544. In this respect, a signal comes in from the logic to activate one of several crystals in sequence. These crystals are scanned by the logic signals. Since the receiver input frequency, i.e., the frequency to which the receiver is tuned, is controlled by the frequency of these crystals, the receiver is tuned to one of several different channels by switching the crystals.

When a call comes in, or when a call is to be made, the transmitter circuitry and the VOX are activated by the logic signal indicating an off-hook position. The transmitter crystal switch serves the same type function as the receiver crystal switch, namely, to place the transmitter on the appropriate channel which is selected by the logic.

When a signal comes in from the handset, it passes through the input filter 554, which is a single-pole, low pass filter, to equalize the tones and signals from the microphone. A portion of this signal passes through the isolation amplifier 556 which isolates the transmitter audio input stages from the VOX circuitry, and passes into the transmitter circuit to frequency-modulate the transmitter. The signal is also applied to the input of the VOX preamplifier 550, where it is stepped up in level from the low millivolts, to operate the detector stage. The detector converts the audio signal to DC, while the pulse shaper squares up the signal from the detector to provide good, fast rise and fall intervals to the power amplifier 552. The power amplifier then takes this signal, which is swinging in voltage but is at high impedance, and uses this signal to turn on the DC power to the transmitter itself.

The signal coming from the transmitter 546 and the signal passing to the receiver 542 use a common antenna which is shown at 558 connected to a duplexer 560. The two signals are separated by the duplexer so that one antenna can be shared. This sharing is made possible by the large difference in frequency of 5 MHz. The two crystal switches are locked together by the logic signals so that they always maintain the five megacycle spacing.

The antenna 558 is of the helical type adapted for the 450 to 470 HMz band. The duplexer is a standard type, for example, "Model MR337B" manufactured by "Sinclair Radio Laboratories", which is modified by removing the four cavities, with their associated cabling, from their housing and mounting them on the cover of the shield can. The transmitter and receiver boards are standard, commercially-available units which are modified to reduce their size.

Figure 9:
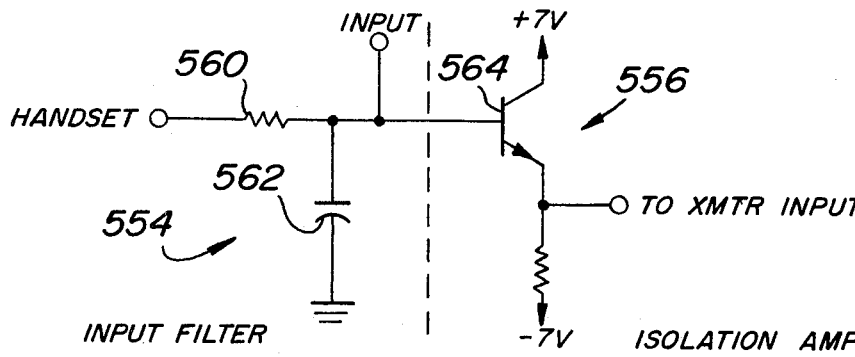
FIG. 9 is a schematic view of an input filter portion of the handset.

The input filter is shown in FIG. 9 and comprises a single-pole resistor 560 and a capacitor 562 to form a low-pass filter to roll off the excessive highs primarily from the microphone portion of the handset, while the isolation amplifier, also shown in FIG. 9, comprises an emitter follower 564 which serves to restrain the turn-on transient that comes out of the audio amplifier of the transmitter system from returning through the VOX line and tripping the VOX inadvertently. Since this isolation amplifier must run continuously when it is on, it draws low current to avoid excessive drain on the battery.

The VOX preamplifier detector and shaping circuitry 550 is shown in FIG. 10. The purpose of this system is to turn on the transmitter only when there is actual information to be transmitted, and to keep the transmitter off while there are neither tones nor voice signals, nor any kind of information being transmitted. This is to reduce the drain on the battery because the transmitter draws high current if it is left on during an entire conversation, listening as well as talking.

The basic circuit comprises a two-stage audio amplifier, of the low-current type, which takes the low millivolt level signal from the handset, and amplifies it through the two stages of audio gain indicated at 556 and 558, to boost it to a level of 100 millivolts or more. The amplified signal is then passed to the transistor 560 which is biased just enough to maintain the voltage on the collector at a low or slightly negative level with respect to ground. The transistor 560, the capacitor 562, the diode 564 and the resistor 566 comprise a detector which operates in the same manner as the transistor 352 and its associated components described previously. The effect is to turn the VOX on almost instantaneously with a voice or tone signal, and it remains on for a period of about one second.

The signal from the capacitor 562 is coupled to a three-stage amplifier consisting of amplifiers 568, 570 and 572 connected in series. These three stages provide a good, clean, fast rise and a fast fall output signal. This signal is passed to the VOX output amplifier.

The VOX output amplifier is a straight forward current amplifier where the signal comes in through a moderately high resistance 574, into a "PNP Darlington pair" 576, which applies +8 volts, at up to about 1 ampere, to the transmitter. When the collector on this "Darlington pair" goes positive, this positive-going swing is used to drive another "Darlington pair" 578 of the "NPN" type, which applies −8 volts to the transmitter. The effect of this entire circuit is to take the millivolts input signal and convert it to the plus and minus 8 volts at approximately 1 ampere (between ½ and 1 ampere) required by the transmitter circuitry.

Figure 11:
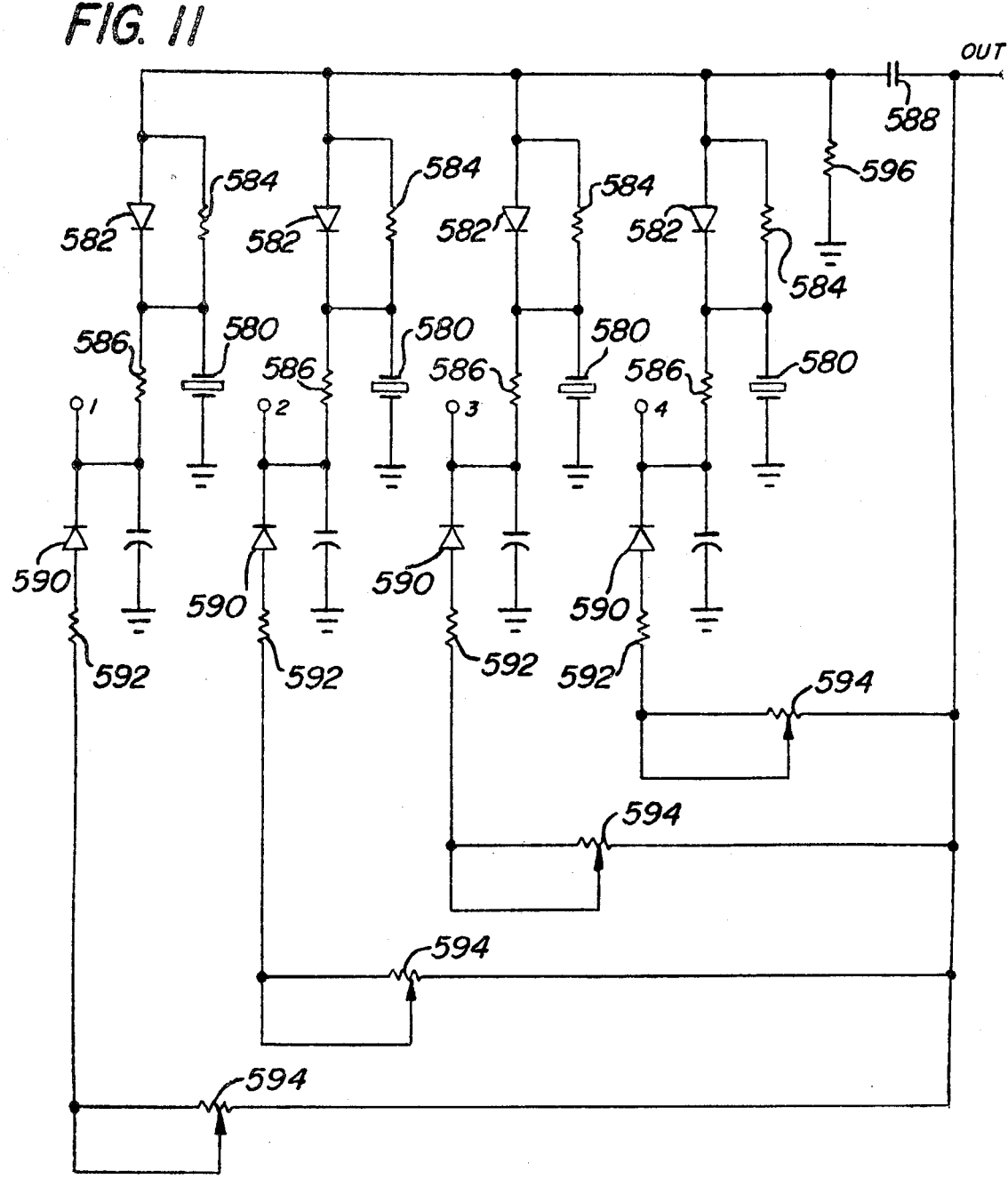
FIG. 11 is a schematic view of a crystal circuitry embodying the present invention.

The crystal switch system used in the present system is shown in FIG. 11. This system consists of identical switches for any desired number of channels. Each channel on the transmitter, four channels being illustrated, consists of a crystal 580, a PIN diode 582, a resistor 584 in parallel with the diode and a resistor 586. The resistor 584 and the PIN diode 582 are coupled out through a capacitor 588. A diode 590 has its cathode connected to the resistor 586. The diode 590 is connected in series to a resistor 592 and rheostat 594. The junction of the anode of the diode 582 and the resistor 584 is the common point for all channels. All channels are tied to ground through a resistor 596 and to the output of the crystal switch through the capacitor 588. The end of the rheostat 594 that is remote from the resistor 592 on each channel is also common and ties to the output side of the capacitor 588.

With the above arrangement, a negative signal on any line will turn on the channel. In operation, one line is negative and the other three are positive: this results in a small current flow through the resistor 586 and the diode 582, thence through the resistor 596 back to ground on the channel that is negative. This turns on the diode with the negative input and allows the crystal to be connected to the output through the blocking capacitor.

On the channels with the positive signal on their inputs, the PIN diode 582 is back-biased, turning off the diode and disconnecting the crystal. The purpose of the resistor 586 is to isolate the input line RF-wise from the crystal. The purpose of the resistor 584 is to provide a high-resistance path from any crystal not in use. The crystal is used in its series mode, and a high resistance in series with the crystal effectively kills any effect from that crystal. This resistor 584 also swamps out the capacitive coupling through the diode 582. It is a much lower impedance than the reactance of the capacitor, and the net effect of the parallel combination of the diode capacitance and the resistor is a reasonably high series resistance with the crystal.

The purpose of the diode 590, the resistor 592, and the rheostat 594 is to provide a negative voltage to the input of the oscillator which is adjustable. It is necessary to have an individual adjustment on each channel so that each channel can be placed exactly on frequency in spite of small differences in the crystals and slight variations in frequency due to the series effects of the other components used in the switch.

The diode 590 is turned off by a positive input signal so that only the channel with its negative input has any effect on this frequency adjustment.

The receiver crystal switch is identical to that described above, with the exception that the individual frequency trims are omitted. This means that the resistor, 592, and the rheostat 594 are not used on the receiver. This is because it is a phase-locked loop system and the frequency control in the receiver requires a feedback circuit through the other components.

Figure 12:
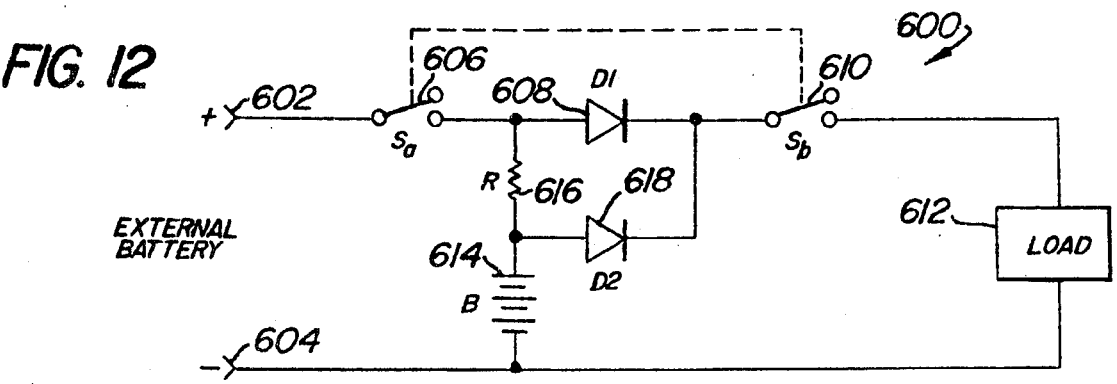
FIG. 12 is a schematic view of an internal battery circuit utilized in the present invention.

Since this invention relates to a portable telephone system and reduction of weight and size is an essential feature, an important aspect of the present system is the reduction of battery size while maintaining a sufficiency of uninterrupted power at all times. In order to maintain uninterrupted power, it is necessary to have both an internal and an external battery so that the internal battery can supply power during the time that the external battery is being recharged or replaced. This would ordinarily, or in other systems, require a full sized internal battery as well as a full-sized external battery. In the present system, however, because of the use of tone bursts rather than continuous transmission, it is only necessary for the system to remember which channel is being used during the battery-changing operation. It is not necessary for the transmitter, the receiver, the handset nor for the majority of the logic to remain activated. It is only necessary for the elements 130, 132, 134, 138, 140, 142, 144, 148, 180, 182, 184, 186, 166 and 168 (shown in FIG. 2A) which constitute a memory, to remain activated, i.e. powered. However, all of these components, combined, require a relatively small current, e.g. less than 10 microampers, because they use complimentary MOS, as compared to a far greater current drain, e.g. almost 1 ampere, when all the components are activated. Therefore, a very much smaller internal battery is required than in other systems. For this purpose, there is provided a circuit, indicated generally at 600, which is shown in FIG. 12 and which functions as follows:

External battery power is supplied to terminals 602 and 604, wherein the + terminal 602 is in series with a switch 606 for turning the unit on and off. When the external battery (not shown) is in place, current flows from the terminal 602 through switch 606, then through diode 608, through switch 610, through the load 612, and then back to the—terminal 604. The load 612 consists of all the components that require power. Simultaneously, battery 614, which is a rechargeable battery, receives a small amount of current, e.g. 1% of the current flowing through the circuit, via resistor 616, this current acting to recharge the battery 614.

The voltage drop across resistor 616 acts to reverse bias the diode 618 and this diode, therefore, does not conduct while the external battery is being used. When the external battery is removed, diode 618 is forward biased so that the low voltage internal battery 614 can then supply sufficient voltage to the decreased load (memory only) described above, while the other components, such as the transmitter, receiver and oscillator in the logic, do not draw current because they automatically stop drawing current when the voltage drops below a predetermined amount, e.g. 4 to 5 volts, whereas the internal battery is set to provide a lesser voltage, e.g. 3 volts. In this manner, continuity is maintained since, while a person is changing the battery, he is not talking and does not require the use of the transmitter and receiver. When the external battery is again in place, the internal battery 614 is automatically recharged from the external battery, so that the internal battery is always in condition to take over when the external battery is removed.

The invention claimed is:

1. A portable telephone system comprising at least one subscriber station and at least one base station in selective communication with each other, a power supply network for supplying power to said telephone system, said power supply network comprising a primary high voltage power source and a secondary low voltage power source, means causing total suspension of power from said primary power source except during periodic intervals of time, whereby said primary power source is alternatively activated and inactivated, and means inhibiting said secondary power source from supplying power to said system while said primary power source is activated and permitting said secondary power source to supply power to said system while said primary power source is inactivated, said subscriber station having a memory means for storing an indication of the channel to which said system is tuned when said primary power source becomes inactivated, and said secondary power source supplying power substantially only to said memory means while said primary power source is inactivated, whereby said memory means retains the indication of said channel while said primary power source is inactivated.

2. The system of claim 1 wherein said primary power source is a removable battery, said secondary power source being activated while said primary power source is removed from said network.

3. The system of claim 1 wherein said system comprises a control means in addition to said memory means, said primary power source, when it is activated, supplying sufficient power both to said control means and to said memory means to activate both said control means and said memory means, and said secondary power source supplying only sufficient power during inactivation of said primary power source to activate said memory means.

4. The system of claim 1 wherein said secondary power source is rechargeable and is charged by said primary power source during said periodic intervals of time.

5. The system of claim 4 wherein said secondary power source is a single battery.

* * * * *